US012562289B2

(12) United States Patent
Head et al.

(10) Patent No.: US 12,562,289 B2
(45) Date of Patent: Feb. 24, 2026

(54) FISSION PRODUCT TRAP FOR SALT PIPE AND PUMP SHAFT SEALS AND METHODS OF USE THEREOF

(71) Applicants: ABILENE CHRISTIAN UNIVERSITY, Abilene, TX (US); Board of Regents, The University of Texas System, Austin, TX (US)

(72) Inventors: Timothy Head, Abilene, TX (US); Derek Haas, Austin, TX (US)

( * ) Notice: Subject to any disclaimer, the term of this patent is extended or adjusted under 35 U.S.C. 154(b) by 428 days.

(21) Appl. No.: 18/157,561

(22) Filed: Jan. 20, 2023

(65) Prior Publication Data

US 2024/0249852 A1 Jul. 25, 2024

(51) Int. Cl.
*G21C 13/067* (2006.01)
*G21C 19/307* (2006.01)

(52) U.S. Cl.
CPC ......... *G21C 13/067* (2013.01); *G21C 19/307* (2013.01)

(58) Field of Classification Search
CPC ... G21C 11/022; G21C 11/026; G21C 11/028; G21C 13/032; G21C 13/067; G21C 13/10; F16L 19/02; F16L 19/028; F16L 19/0286; F16L 19/0212; F16L 19/06; F16L 19/061; F16L 19/065; F16L 19/07; F16L 23/036; F16L 55/16; F16L 55/168; F16L 55/17
USPC ............... 376/203, 287, 288, 292, 310, 313; 285/364, 365, 369, 371, 373
See application file for complete search history.

(56) References Cited

U.S. PATENT DOCUMENTS 96,962 A * 11/1869 Reinshagen .......... F16L 13/141 285/330
2,291,709 A 8/1942 Goetze
2,669,465 A 2/1954 Newell
2,795,482 A 6/1957 McNabney
3,387,867 A 6/1968 Rogers
3,471,181 A 10/1969 Fuentes
(Continued)

FOREIGN PATENT DOCUMENTS

CN 203400551 1/2014
CN 102878109 11/2014
(Continued)

OTHER PUBLICATIONS

Lane, James A., Herbert G. MacPherson, and Frank Maslan. Fluid fuel reactors: Molten salt reactors, aqueous homogeneous reactors, fluoride reactors, chloride reactors, liquid metal reactors and why liquid fission. Addison-Wesley Pub. Co., 1958, Chapter 15. (Year: 1958).*

(Continued)

*Primary Examiner* — Jinney Kil
(74) *Attorney, Agent, or Firm* — King & Spalding

(57) ABSTRACT

A fission product trap for a reactor system, such as for a pipe connection and/or a pump shaft of a pump of the reactor system, includes a porous container. The porous container may be mounted about the pipe connection and/or pump shaft and include an absorbing material contained therein. The absorbing material may be configured to collect fission products emitted from the pipe connection and/or the pump shaft. The fission product trap further includes an assembly encompassing the porous container and that defines a volume about the porous container and the pipe connection and/or the pump shaft.

10 Claims, 13 Drawing Sheets

(56) References Cited

U.S. PATENT DOCUMENTS

| | | | | |
|---|---|---|---|---|
| 3,730,833 | A | 5/1973 | Cremeans | |
| 3,972,547 | A | 8/1976 | Itoya | |
| 3,976,542 | A * | 8/1976 | Fortescue | G21C 3/16 376/456 |
| 4,069,100 | A * | 1/1978 | Cooper | G21C 13/10 376/205 |
| 4,539,846 | A | 9/1985 | Grossman | |
| 5,016,920 | A | 5/1991 | Anderson | |
| 5,630,592 | A | 5/1997 | Obara et al. | |
| 6,125,912 | A | 10/2000 | Branagan et al. | |
| 6,186,159 | B1 | 2/2001 | DeGood | |
| 7,160,367 | B2 | 1/2007 | Babicki | |
| 7,400,697 | B1 | 7/2008 | Carmack et al. | |
| 7,648,792 | B2 | 1/2010 | Kaschmitter | |
| 7,707,987 | B2 | 5/2010 | Guthrie | |
| 7,931,080 | B2 | 4/2011 | O'Brien | |
| 7,980,304 | B2 | 7/2011 | O'Brien | |
| 8,186,430 | B2 | 5/2012 | O'Brien | |
| 8,238,509 | B2 | 8/2012 | Moen et al. | |
| 8,636,892 | B2 | 1/2014 | Koehl et al. | |
| 8,703,063 | B2 | 4/2014 | Hottovy | |
| 8,746,440 | B2 | 6/2014 | Williamson et al. | |
| 8,767,905 | B2 | 7/2014 | Neeley et al. | |
| 8,771,482 | B2 | 7/2014 | Bailey et al. | |
| 8,900,439 | B2 | 12/2014 | Wiedmeyer et al. | |
| 8,956,524 | B2 | 2/2015 | Wiedmeyer et al. | |
| 9,008,257 | B2 | 4/2015 | Hyde et al. | |
| 9,017,527 | B2 | 4/2015 | Wiedmeyer et al. | |
| 9,074,922 | B2 | 7/2015 | Dayal et al. | |
| 9,150,975 | B2 | 10/2015 | Berger et al. | |
| 9,208,909 | B2 | 12/2015 | Runkle et al. | |
| 9,224,507 | B2 | 12/2015 | Heinold et al. | |
| 9,251,920 | B2 | 2/2016 | Loewen et al. | |
| 9,305,673 | B2 | 4/2016 | Heinold et al. | |
| 9,324,465 | B2 | 4/2016 | Splichal, Jr. | |
| 9,368,238 | B2 | 6/2016 | Theofanous et al. | |
| 9,368,241 | B2 | 6/2016 | Loewen et al. | |
| 9,376,639 | B2 | 6/2016 | Walter et al. | |
| 9,443,623 | B2 | 9/2016 | Ahlfeld | |
| 9,460,818 | B2 | 10/2016 | Bergman | |
| 9,475,706 | B2 | 10/2016 | Policke et al. | |
| 9,522,462 | B2 | 12/2016 | Baker et al. | |
| 9,691,507 | B2 | 6/2017 | Hyde et al. | |
| 9,691,508 | B2 | 6/2017 | Hyde et al. | |
| 9,728,288 | B2 | 8/2017 | Hyde et al. | |
| 9,748,007 | B2 | 8/2017 | Hyde et al. | |
| 9,761,336 | B2 | 9/2017 | Caine et al. | |
| 9,761,337 | B2 | 9/2017 | Hyde et al. | |
| 9,799,417 | B2 | 10/2017 | Hyde et al. | |
| 9,875,817 | B2 | 1/2018 | Edwards et al. | |
| 9,875,818 | B2 | 1/2018 | Mark et al. | |
| 9,881,700 | B2 | 1/2018 | LeBlanc | |
| 9,892,807 | B2 | 2/2018 | Hyde et al. | |
| 9,894,802 | B2 | 2/2018 | Loewen et al. | |
| 9,911,514 | B2 | 3/2018 | Edwards et al. | |
| 9,921,158 | B2 | 3/2018 | Rider | |
| 9,941,025 | B2 | 4/2018 | Ahlfeld et al. | |
| 10,041,163 | B1 | 8/2018 | Offer et al. | |
| 10,056,160 | B2 | 8/2018 | LeBlanc | |
| 10,141,079 | B2 | 11/2018 | Czerwinski et al. | |
| 10,144,874 | B2 | 12/2018 | Walter | |
| 10,147,506 | B2 | 12/2018 | Malloy, III et al. | |
| 10,176,901 | B2 | 1/2019 | Loewen | |
| 10,197,200 | B2 | 2/2019 | Kolb et al. | |
| 10,221,499 | B2 | 3/2019 | Miller et al. | |
| 10,229,757 | B2 | 3/2019 | Filippone | |
| 10,280,527 | B2 | 5/2019 | Loewen et al. | |
| 10,290,381 | B2 | 5/2019 | Caine et al. | |
| 10,311,981 | B2 | 6/2019 | Hackett et al. | |
| 10,343,102 | B2 | 7/2019 | Reasoner | |
| 10,388,419 | B2 | 8/2019 | Sakuma et al. | |
| 10,434,494 | B2 | 10/2019 | Kobayashi et al. | |
| 10,438,705 | B2 | 10/2019 | Cheatham, III | |
| 10,497,479 | B2 | 12/2019 | Abbott | |
| 10,497,480 | B2 | 12/2019 | Cheatham, III et al. | |
| 10,515,729 | B2 | 12/2019 | Horn et al. | |
| 10,535,437 | B2 | 1/2020 | Hyde et al. | |
| 10,566,096 | B2 | 2/2020 | Czerwinski | |
| 10,566,101 | B2 | 2/2020 | Corpora | |
| 10,573,416 | B2 | 2/2020 | Venneri | |
| 10,636,532 | B2 | 4/2020 | Anderson et al. | |
| 10,643,754 | B2 | 5/2020 | Venneri | |
| 10,650,934 | B2 | 5/2020 | Caine et al. | |
| 10,665,356 | B2 | 5/2020 | Abbott | |
| 10,685,750 | B2 * | 6/2020 | Eichel | G21C 3/17 |
| 10,734,122 | B2 | 8/2020 | Cisneros, Jr. | |
| 10,738,367 | B2 | 8/2020 | Hackett | |
| 10,741,293 | B2 | 8/2020 | Abbott | |
| 10,755,822 | B2 | 8/2020 | Gibbons et al. | |
| 10,760,004 | B2 | 9/2020 | Garcia-Perez et al. | |
| 10,787,609 | B2 | 9/2020 | Garcia-Perez et al. | |
| 10,787,610 | B2 | 9/2020 | Goodrich et al. | |
| 10,825,571 | B2 | 11/2020 | Edwards et al. | |
| 10,867,710 | B2 | 12/2020 | Cisneros, Jr. | |
| 10,923,238 | B2 | 2/2021 | Abbott | |
| 10,937,557 | B2 | 3/2021 | Sineath et al. | |
| 10,962,461 | B2 | 3/2021 | Linneen | |
| 11,028,303 | B2 | 6/2021 | Corbin et al. | |
| 11,031,140 | B2 | 6/2021 | Hunt et al. | |
| 11,043,309 | B2 | 6/2021 | Nygaard et al. | |
| 11,049,624 | B2 | 6/2021 | Loewen et al. | |
| 11,075,013 | B2 | 7/2021 | Abbott et al. | |
| 11,075,015 | B2 | 7/2021 | Cisneros, Jr. | |
| 11,133,114 | B2 | 9/2021 | Hackett et al. | |
| 11,136,245 | B2 | 10/2021 | Benson | |
| 11,145,424 | B2 | 10/2021 | Abbott | |
| 11,149,623 | B2 | 10/2021 | Kutsch | |
| 11,170,901 | B2 | 11/2021 | Cheatham, III | |
| 11,200,991 | B2 | 12/2021 | LeBlanc | |
| 11,205,523 | B2 | 12/2021 | Hyde et al. | |
| 11,257,600 | B2 | 2/2022 | Anderson et al. | |
| 11,264,141 | B2 | 3/2022 | Venneri | |
| 11,276,503 | B2 | 3/2022 | Cisneros, Jr. et al. | |
| 11,289,212 | B2 | 3/2022 | Inman et al. | |
| 11,342,084 | B2 | 5/2022 | Cheatham, III et al. | |
| 11,342,085 | B2 | 5/2022 | Hinds | |
| 11,367,536 | B2 | 6/2022 | Abbott | |
| 11,373,765 | B2 | 6/2022 | Czerwinski | |
| 11,373,769 | B2 | 6/2022 | Hinds | |
| 11,380,450 | B2 | 7/2022 | Sineath et al. | |
| 11,417,435 | B2 | 8/2022 | Nelson | |
| 11,417,437 | B2 | 8/2022 | Venneri | |
| 11,424,041 | B2 | 8/2022 | Fisher et al. | |
| 11,428,564 | B2 | 8/2022 | Dayal et al. | |
| 11,434,429 | B2 | 9/2022 | Goodrich et al. | |
| 11,437,156 | B2 | 9/2022 | Russell, II et al. | |
| 11,443,859 | B2 | 9/2022 | Bass et al. | |
| 11,482,345 | B2 | 10/2022 | Hunt et al. | |
| 11,488,731 | B2 | 11/2022 | Abbott | |
| 11,495,363 | B2 | 11/2022 | Gramlich, II et al. | |
| 11,501,883 | B2 | 11/2022 | Eichel et al. | |
| 11,542,437 | B2 | 1/2023 | Garcia-Perez et al. | |
| 11,545,274 | B2 | 1/2023 | Bass et al. | |
| 11,569,000 | B2 | 1/2023 | Hinds | |
| 11,574,094 | B2 | 2/2023 | Pivovar et al. | |
| 11,842,819 | B2 | 12/2023 | Corbin | |
| 12,018,779 | B2 | 6/2024 | Bailey | |
| 12,292,138 | B2 | 5/2025 | Bailey | |
| 2006/0000007 | A1 | 1/2006 | Lin | |
| 2007/0001933 | A1 | 1/2007 | Hoffmann | |
| 2009/0046825 | A1 | 2/2009 | Dulka et al. | |
| 2009/0173491 | A1 | 7/2009 | O'Brien | |
| 2010/0266084 | A1 * | 10/2010 | Ahlfeld | G21C 3/00 376/412 |
| 2012/0012330 | A1 | 1/2012 | Botich | |
| 2012/0082911 | A1 | 4/2012 | Hyde et al. | |
| 2012/0082913 | A1 | 4/2012 | Hyde et al. | |
| 2012/0087455 | A1 | 4/2012 | Hyde et al. | |
| 2013/0083878 | A1 | 4/2013 | Massie et al. | |
| 2014/0185733 | A1 | 7/2014 | Povirk et al. | |
| 2015/0228363 | A1 | 8/2015 | Dewan et al. | |
| 2015/0310948 | A1 | 10/2015 | Venneri | |
| 2016/0189812 | A1 | 6/2016 | Czerwinski | |
| 2016/0189813 | A1 | 6/2016 | Cisneros, Jr. | |

(56) References Cited

U.S. PATENT DOCUMENTS

| | | | |
|---|---|---|---|
| 2016/0217874 | A1 | 7/2016 | Dewan et al. |
| 2016/0272903 | A1 | 9/2016 | Walter et al. |
| 2017/0206984 | A1 | 7/2017 | Lee et al. |
| 2017/0271033 | A1 | 9/2017 | Dodson et al. |
| 2017/0292179 | A1 | 10/2017 | Hackett |
| 2017/0294240 | A1 | 10/2017 | Baglietto et al. |
| 2017/0294241 | A1 | 10/2017 | Dodson et al. |
| 2017/0301413 | A1 | 10/2017 | Cisneros, Jr. |
| 2017/0301418 | A1 | 10/2017 | Dodson et al. |
| 2017/0316840 | A1 | 11/2017 | Abbott |
| 2018/0030576 | A1 | 2/2018 | Urza |
| 2018/0244535 | A1 | 8/2018 | Russell, II et al. |
| 2018/0254109 | A1 | 9/2018 | Cheatham, III et al. |
| 2018/0322968 | A1 | 11/2018 | Cheatham, III et al. |
| 2019/0035510 | A1 | 1/2019 | LeBlanc |
| 2019/0057783 | A1 | 2/2019 | LeBlanc |
| 2019/0066857 | A1 | 2/2019 | Hackett et al. |
| 2019/0139665 | A1 | 5/2019 | Czerwinski et al. |
| 2019/0203614 | A1 | 7/2019 | Loewen et al. |
| 2019/0371482 | A1 | 12/2019 | Benson |
| 2020/0027581 | A1 | 1/2020 | Hackett et al. |
| 2020/0087156 | A1 | 3/2020 | Kelleher |
| 2020/0122109 | A1 | 4/2020 | Kruizenga et al. |
| 2020/0161015 | A1 | 5/2020 | Czerwinski et al. |
| 2020/0373024 | A1 | 11/2020 | Gramlich |
| 2020/0393123 | A1 | 12/2020 | Aly |
| 2021/0047199 | A1 | 2/2021 | Russell, II et al. |
| 2021/0047568 | A1 | 2/2021 | Goodrich et al. |
| 2021/0095645 | A1 | 4/2021 | Cheatham, III |
| 2021/0130181 | A1 | 5/2021 | Brown et al. |
| 2021/0170676 | A1 | 6/2021 | Kitchen et al. |
| 2021/0210224 | A1 | 7/2021 | Cisneros, Jr. |
| 2021/0272707 | A1 | 9/2021 | Wardle |
| 2021/0272708 | A1 | 9/2021 | Cisneros, Jr. |
| 2021/0287814 | A1 | 9/2021 | Loewen et al. |
| 2021/0302295 | A1 | 9/2021 | Linneen |
| 2021/0304909 | A1 | 9/2021 | Gramlich et al. |
| 2021/0313081 | A1 | 10/2021 | Nygaard et al. |
| 2021/0318673 | A1 | 10/2021 | Kitchen et al. |
| 2021/0319920 | A1 | 10/2021 | Gramlich et al. |
| 2021/0343431 | A1 | 11/2021 | Cisneros, Jr. |
| 2022/0005619 | A1 | 1/2022 | Cisneros, Jr. |
| 2022/0017382 | A1 | 1/2022 | Russell, II et al. |
| 2022/0051814 | A1 | 2/2022 | Freeman et al. |
| 2022/0051816 | A1 | 2/2022 | Freeman |
| 2022/0051817 | A1 | 2/2022 | Hejzlar et al. |
| 2022/0051818 | A1 | 2/2022 | Cisneros, Jr. |
| 2022/0051820 | A1 | 2/2022 | Corbin |
| 2022/0068512 | A1 | 3/2022 | Russell, II et al. |
| 2022/0081317 | A1 | 3/2022 | Russell, II et al. |
| 2022/0115149 | A1 | 4/2022 | Barringer et al. |
| 2022/0115150 | A1 | 4/2022 | Hackett et al. |
| 2022/0115152 | A1 | 4/2022 | Barringer et al. |
| 2022/0139576 | A1 | 5/2022 | Inman et al. |
| 2022/0139577 | A1 | 5/2022 | Cisneros, Jr. et al. |
| 2022/0139578 | A1 | 5/2022 | Venneri et al. |
| 2022/0250936 | A1 | 8/2022 | Benson |
| 2022/0254524 | A1 | 8/2022 | Cheatham, III et al. |
| 2022/0301729 | A1 | 9/2022 | Cisneros, Jr. |
| 2022/0301732 | A1 | 9/2022 | Cisneros, Jr. et al. |
| 2022/0310278 | A1 | 9/2022 | Choi et al. |
| 2022/0310281 | A1 | 9/2022 | Czerwinski |
| 2022/0324066 | A1 | 10/2022 | Argentine |
| 2022/0328202 | A1 | 10/2022 | Venneri et al. |
| 2022/0328203 | A1 | 10/2022 | Bass et al. |
| 2022/0328205 | A1 | 10/2022 | Bass et al. |
| 2022/0336118 | A1 | 10/2022 | Corbin et al. |
| 2022/0351870 | A1 | 11/2022 | Fisher et al. |
| 2022/0363995 | A1 | 11/2022 | Goodrich et al. |
| 2022/0375635 | A9 | 11/2022 | LeBlanc |
| 2023/0024338 | A1 | 1/2023 | Reed et al. |
| 2023/0096162 | A1 | 3/2023 | Loewen et al. |
| 2023/0104365 | A1 | 4/2023 | Eichel et al. |
| 2024/0312656 | A1 | 9/2024 | Pamplin |
| 2024/0428961 | A1 | 12/2024 | Pamplin |
| 2025/0018367 | A1 | 1/2025 | Frattini |
| 2025/0037889 | A1 | 1/2025 | Pamplin |

FOREIGN PATENT DOCUMENTS

| | | |
|---|---|---|
| CN | 104214420 | 12/2014 |
| CN | 102937090 | 4/2015 |
| CN | 104862531 | 8/2015 |
| CN | 105060914 | 11/2015 |
| CN | 106425315 | 2/2017 |
| CN | 105334138 | 1/2018 |
| CN | 106180254 | 6/2018 |
| CN | 108151567 | 6/2018 |
| CN | 108172318 | 6/2018 |
| CN | 108389634 | 8/2018 |
| CN | 108511088 | 9/2018 |
| CN | 108520785 | 9/2018 |
| CN | 207850147 | 9/2018 |
| CN | 108624839 | 10/2018 |
| CN | 107034386 | 11/2018 |
| CN | 109173419 | 1/2019 |
| CN | 107130242 | 3/2019 |
| CN | 109509562 | 3/2019 |
| CN | 106840765 | 4/2019 |
| CN | 109671510 | 4/2019 |
| CN | 105976879 | 5/2019 |
| CN | 108198635 | 7/2019 |
| CN | 110042434 | 7/2019 |
| CN | 108206065 | 9/2019 |
| CN | 109022921 | 9/2019 |
| CN | 107469628 | 10/2019 |
| CN | 107945887 | 10/2019 |
| CN | 108389632 | 10/2019 |
| CN | 109234573 | 10/2019 |
| CN | 209496626 | 10/2019 |
| CN | 110783010 | 2/2020 |
| CN | 110842494 | 2/2020 |
| CN | 210039648 | 2/2020 |
| CN | 107238627 | 3/2020 |
| CN | 108167195 | 7/2020 |
| CN | 111508627 | 8/2020 |
| CN | 211742680 | 10/2020 |
| CN | 112284170 | 1/2021 |
| CN | 110549697 | 4/2021 |
| CN | 112609195 | 4/2021 |
| CN | 212934166 | 4/2021 |
| CN | 110444311 | 5/2021 |
| CN | 112778012 | 5/2021 |
| CN | 108417277 | 6/2021 |
| CN | 110695091 | 6/2021 |
| CN | 113202780 | 8/2021 |
| CN | 113369652 | 9/2021 |
| CN | 214529256 | 10/2021 |
| CN | 113630582 | 11/2021 |
| CN | 113658722 | 11/2021 |
| CN | 111334258 | 12/2021 |
| CN | 111421913 | 12/2021 |
| CN | 113744900 | 12/2021 |
| CN | 113851233 | 12/2021 |
| CN | 214998262 | 12/2021 |
| CN | 113936820 | 1/2022 |
| CN | 113990535 | 1/2022 |
| CN | 111627571 | 2/2022 |
| CN | 113061781 | 2/2022 |
| CN | 114074234 | 2/2022 |
| CN | 114093529 | 2/2022 |
| CN | 215770541 | 2/2022 |
| CN | 111057993 | 3/2022 |
| CN | 112853100 | 7/2022 |
| CN | 114774738 | 7/2022 |
| CN | 112228853 | 8/2022 |
| CN | 112259263 | 8/2022 |
| CN | 112530614 | 8/2022 |
| CN | 114917603 | 8/2022 |
| CN | 114927242 | 8/2022 |
| CN | 111627572 | 9/2022 |
| CN | 111945171 | 9/2022 |
| CN | 112174670 | 9/2022 |

(56) References Cited

FOREIGN PATENT DOCUMENTS

| | | | | |
|---|---|---|---|---|
| CN | 115050490 | | 9/2022 | |
| CN | 115076479 | | 9/2022 | |
| CN | 111739665 | | 10/2022 | |
| CN | 112316724 | | 11/2022 | |
| CN | 112992389 | | 11/2022 | |
| CN | 115351276 | | 11/2022 | |
| CN | 112587989 | | 12/2022 | |
| CN | 113241200 | | 12/2022 | |
| CN | 115436402 | | 12/2022 | |
| EP | 3563389 | | 7/2021 | |
| GB | 1402100 | A * | 8/1975 | ............ F16L 19/061 |
| RU | 215749 | | 12/2022 | |
| WO | WO 2013077941 | | 10/2013 | |
| WO | WO 2014039641 | | 6/2014 | |
| WO | WO 2015017928 | | 2/2015 | |
| WO | WO 2015094450 | | 10/2015 | |
| WO | WO 2017032379 | | 3/2017 | |
| WO | WO 2017059360 | | 4/2017 | |
| WO | WO 2017192607 | | 11/2017 | |
| WO | WO 2018009433 | | 1/2018 | |
| WO | WO 2018013317 | | 1/2018 | |
| WO | WO 2017199059 | | 2/2018 | |
| WO | WO 2018031148 | | 2/2018 | |
| WO | WO 2018026429 | | 3/2018 | |
| WO | WO 2018042216 | | 4/2018 | |
| WO | WO 2018064572 | | 4/2018 | |
| WO | WO 2018071081 | | 5/2018 | |
| WO | WO 2018084940 | | 6/2018 | |
| WO | WO 2018213669 | | 1/2019 | |
| WO | WO 2019152595 | | 8/2019 | |
| WO | WO 2019226218 | | 1/2020 | |
| WO | WO 2019231971 | | 1/2020 | |
| WO | WO 2020123513 | | 8/2020 | |
| WO | WO 2021151055 | | 7/2021 | |
| WO | WO 2021133952 | | 9/2021 | |
| WO | WO 2022022792 | | 2/2022 | |
| WO | WO 2022039795 | | 2/2022 | |
| WO | WO 2022039893 | | 2/2022 | |
| WO | WO 2022040116 | | 3/2022 | |
| WO | WO 2022061195 | | 4/2022 | |
| WO | WO 2022146446 | | 7/2022 | |
| WO | WO 2024217652 | | 10/2024 | |

OTHER PUBLICATIONS

Cheng et al. Molten salt-assisted carbonized zeolite imidazolate framework on nickel foam for highly efficient iodide capture in fluoride molten salts (2023), Chemical Engineering Journal 477, (2023), 1472383.

H. Zhou, J. R. Long, O. M. Yaghi (2012). "Introduction to Metal-Organic Frameworks." Chemical Re-views. Chem. Rev. 2012, 112, 673-674.

Medha Kasula, Tin Le, Adrienne Thomsen, Milad Rabbani Esfahani (2022). "Silver metal organic frameworks and copper metal organic frameworks immobilized on graphene oxide for enhanced adsorption in water treatment." Chemical Engineering Journal, vol. 439, 2022, 135542, ISSN 1385-8947.

V. Sanderyd (2018). "Novel Hybrid Nanomaterials—Combining Mesoporous Magnesium Carbonate and Metal-Organic Frameworks." UPPSALA Universitet.

Osama Abuzalat et al. (2018). Sonochemical fabrication of Cu(II) and Zn(II) metal-organic framework films on metal substrates, *Ultrasonics Sonochemistry*, vol. 45, 2018, pp. 180-188, ISSN 1350-4177.

Chung, Yongchul G., et al. "Advances, updates, and analytics for the computation-ready, experimental metal-organic framework database: CoRE MOF 2019." Journal of Chemical & Engineering Data 64.12 (2019): 5985-5998. (Year: 2019).

Andrews, Hunter B., et al. "Review of molten salt reactor off-gas management considerations." Nuclear Engineering and Design 385 (2021): 111529. (Year: 2021).

Andrews, Hunter B., Praveen K. Thallapally, and Alexander J. Robinson. "Monitoring xenon capture in a metal organic framework using laser-induced breakdown spectroscopy." Micromachines 14.1 (2022): 82. (Year: 2022).

Banerjee, Debasis, et al. "Xenon gas separation and storage using metal-organic frameworks." Chem 4.3 (2018): 466-494. (Year: 2018).

Baron et al. N EA (2022), Treatment of Volatile Fission Products, OECD Publishing, Paris. (Year: 2022).

Degueldre, Claude, et al. "Fission gas released from molten salt reactor fuel: the case of noble gas short life radioisotopes for radiopharmaceutical application." Medicine in Novel Technology and Devices 10 (2021): 100057. (Year: 2021).

Mcfarlane, Joanna, et al. Molten Salt Reactor Engineering Study for Off-Gas Management. No. ORNL/TM-2020/1602. Oak Ridge National Laboratory (ORN L), Oak Ridge, TN (United States), 2020. (Year: 2020).

* cited by examiner

FISSION PRODUCT TRAP FOR SALT PIPE AND PUMP SHAFT SEALS AND METHODS OF USE THEREOF

TECHNICAL FIELD

The described examples relate generally to systems, devices, and techniques for mitigating the environmental, health, and safety impacts associated with the emission of fission products in a reactor system, such as a molten salt reactor system.

BACKGROUND

Fission products may be emitted from certain components within a reactor system, such a molten salt reactor system. As one example, radioactive iodine or other fission products may be emitted from a connection or junction of two pipes of the reactor system. As another example, radioactive iodine or other fission products may be emitted from or along a pump shaft of a pump of the reactor system. Emission of such fission products may cause certain undesirable environmental, health, and safety conditions within the reactor system. While the reactor system may be housed or otherwise contained within an enclosure or containment vessel, it may be desirable to limit the buildup of fission products within such containment. As such, there is a need for systems and techniques to facilitate fission product capture in a reactor system at the source of the emission, such as at or in proximity to an example pipe connection and/or pump shaft.

SUMMARY

In one example, a fission product trap for a pipe connection of a reactor system is disclosed. The trap includes a porous container mounted about the pipe connection and having an absorbing material contained therein that is configured to collect fission products emitted from the pipe connection. The trap further includes an assembly encompassing the porous container and defining a volume about the porous container and the pipe connection.

In another example, the absorbing material includes loose activated carbon, silver zeolite, carbon nanostructures and/or any other material that is configured to collect and trap fission products therein.

In another example, the fission products include radioactive iodine, tritium, tellurium, cesium, bromine and/or other fission products.

In another example, the porous container encompasses the pipe connection and forms a sealed volume therearound.

In another example, the pipe connection may be defined by a pair of flanges. In this regard, the porous container may define a recessed band configured to receive the pair of flanges therein.

In another example, the porous container may include an inner shell that defines the recessed band, and an outer shell arranged about the inner shell and defining a holding space therebetween. The absorbing material may therefore be arranged in the holding space.

In another example, the inner shell may define a plurality of holes positioned within the recessed band.

In another example, the assembly includes a sleeve arranged over the porous container and the pipe connection. The assembly may further include a pair of clamping assemblies. Each clamping assembly of the pair of clamping assemblies may be arranged along an end of the sleeve and configured to define a sealed connection with a respective pipe associated with the pipe connection.

In another example, each clamping assembly of the pair of clamping assemblies includes a clamping shaft having a threaded outer surface and an axial passage therethrough such that the axial passage is configured to receive the respective pipe. Each clamping assembly of pair of clamping assemblies further includes a gripping element abutting the clamping shaft along an outer surface of the respective pipe. Each clamping assembly of pair of clamping assemblies includes a clamping nut having a complementary threaded inner surface configured to threadably engage the threaded outer surface of the clamping shaft.

In another example, in response to a threaded engagement of the clamping shaft and the clamping nut toward one another, the gripping element may be compressed therebetween and encouraged toward the outer surface of the respective pipe to establish a sealed boundary of the clamping assembly.

In another example, a system is disclosed. The system may include a fission product trap, such as any of the fission product traps disclosed herein. The system may further include a first pipe and a second pipe. The first and second pipe cooperate to define the pipe connection.

In another example, a fission product trap for a pump shaft of a pump of a reactor system is disclosed. The trap includes a porous container mounted about the pump shaft and having an absorbing material contained therein that is configured to collect fission products emitted from along the pump shaft. The trap further includes an assembly encompassing the porous container and defining a volume about the porous container and the pump shaft.

In another example, the absorbing material includes loose activated carbon, silver zeolite, carbon nanostructures and/or any other material that is configured to collect and trap fission products therein.

In another example, the fission products include radioactive iodine, tritium, tellurium, cesium, bromine and/or other fission products.

In another example, the trap further includes at least one bearing mounted in a plate and receiving the pump shaft therethrough. The at least one bearing may be configured to permit rotation of the pump shaft while constraining radial movement of the pump shaft relative to the gas tight assembly.

In another example, the porous container includes three sub-containers, each sub-container separated from one another by a respective one of the at least one bearing.

In another example, the pump shaft is associated with a mechanical seal. Accordingly, a first sub container of the porous container may be configured to fit about a periphery of the mechanical seal and extend along and separated from the pump shaft.

In another example, the assembly may be configured to form a volume about the pump shaft and includes a sleeve arranged over the porous container and the pump shaft. The gas-tight assembly further includes a pair of opposing flanges, wherein the sleeve is gasket-sealed to each flange of the pair of opposing flanges at respective ends of the sleeve.

In another example, a system is disclosed. The system includes a trap, such as any of the traps disclosed herein. The system further includes the pump shaft, and associated pump impeller and pump motor.

In another example, a method for capturing fission products from a reactor system is disclosed. The method includes operating the reactor system including generating the fission products. The method further includes emitting the fission products at one or both of a pipe connection or pump shaft of the reactor system. The method further includes receiving the fission products into an absorbing material arranged about the pipe connection or the pump shaft of the reactor system. The absorbing material may be arranged in a porous container mounted about the pipe connection or the pump shaft.

In addition to the example aspects described above, further aspects and examples will become apparent by reference to the drawings and by study of the following description.

Figure 1:
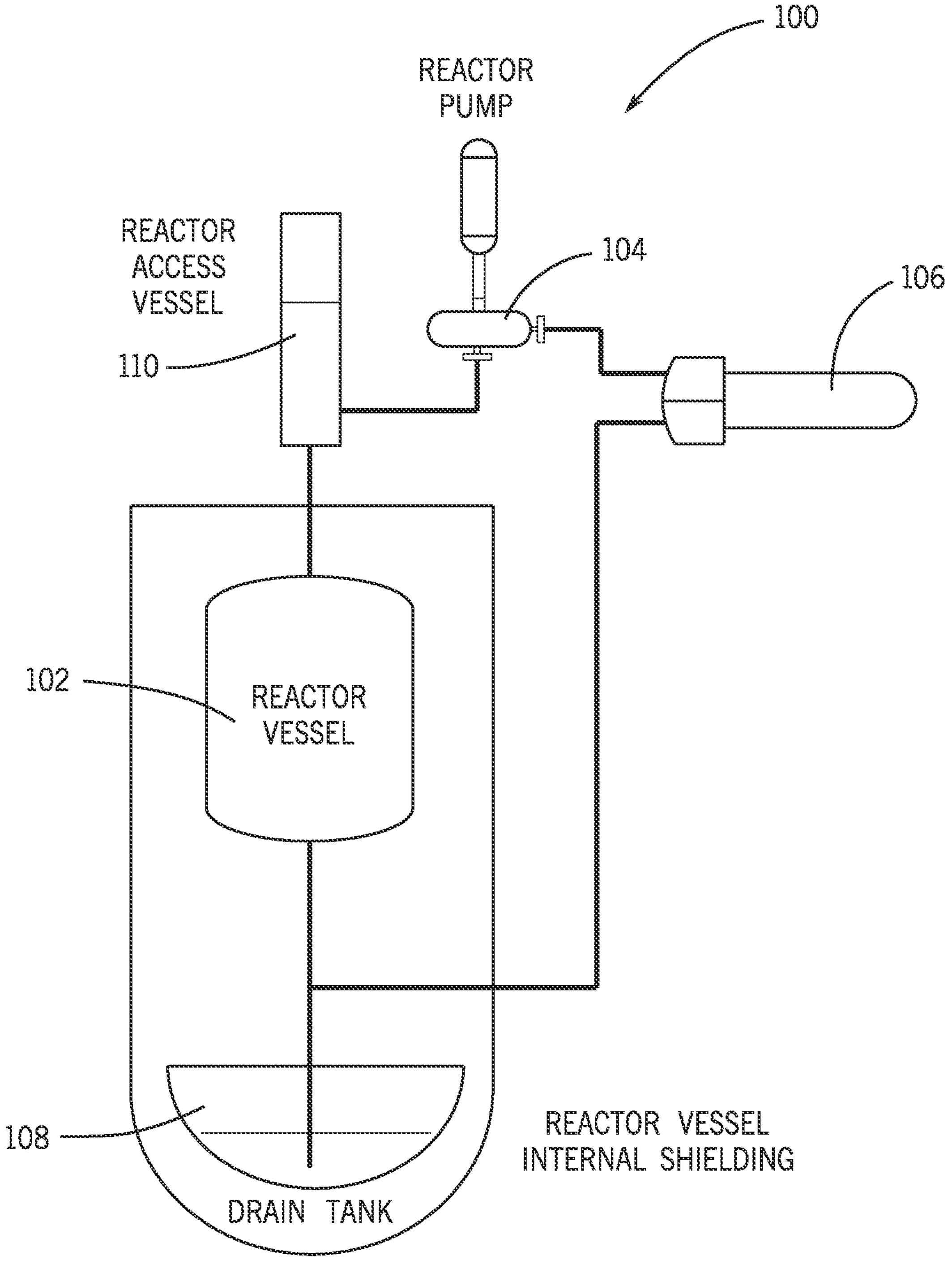
FIG. 1 depicts an example molten salt reactor system.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

The description that follows includes sample systems, methods, and apparatuses that embody various elements of the present disclosure. However, it should be understood that the described disclosure may be practiced in a variety of forms in addition to those described herein.

The following disclosure relates generally to fission product traps for a reactor system, such as a molten salt reactor system. A molten reactor system may broadly include any of a variety of molten salt reactors that are used to produce nuclear power in part by utilizing molten salts as a nuclear fuel in place of the conventional solid fuels used in light water reactors. In molten salt reactors, fission reactions occur within a molten salt composition housed within a reactor vessel. Such fission reactors may produce certain byproducts that exhibit radioactive properties, such as producing radioactive iodine. While molten salt reactor systems are designed to contain such fission products within process equipment (e.g., within pipes, vessels, heat exchanges, and so on), it is possible that the molten salt reactor system could emit a measurable amount of fission products from certain locations with the system; namely, from a connection or junction between two pipes, and/or from or along a pump shaft of a pump of the reactor system (including from components associated with the pump shaft, such as certain mechanical seals). Measurable fission products that exhibit radioactive properties may cause certain undesirable environmental, health, and safety conditions within the reactor system. Conventional techniques that contain emitted fission products within a reactor containment vessel (e.g., that contains all or substantially all of the reactor system) fail to mitigate and capture fission products at the source of emission, which can thus lead to undesirable build up of fission products within the containment vessel.

To mitigate these and other challenges, the fission product traps of the present disclosure may be arranged to trap and capture fission products at or in proximity to the source of emission, such as at or in proximity to a pipe connection or junction and/or a pump shaft of a pump of the reactor system. It will be appreciated that while example traps are described herein with respect to the trapping fission products at or in proximity to the pipe connection and/or the pump shaft of a molten salt reactor, in other examples, the fission product traps of the present disclosure may be adapted to trap fission products emitted from substantially any component, juncture, interface, leak point, and so on within substantially any reactor system. As disclosed herein, the fission product trap may include a porous container having an absorbing material contained therein. The porous container may be configured to be mounted or fit around or encompass some or all of a given pipe connection or pump shaft of the reactor system. The absorbing material may include loose activated carbon, silver zeolite and/or carbon nanostructures that are configured to collect and retain the fission products, such as a radioactive iodine, tritium, tellurium, cesium, bromine, and/or other fission products therein. The porous container is mountable to the pipe connection or along the pump shaft in a manner that allows the fission products to be captured by the absorbing material before the fission products can diffuse to the rest of the reactor system (and eventually the environment).

In order to further mitigate the diffusion of fission products, the fission product trap may further include an assembly encompassing the porous container and defining a volume about the porous container and the pipe connection or pump shaft. In some cases, such assembly may be a gas-tight assembly that defines a sealed volume about the porous container. In this regard, the trap may allow for the absorption of the radioactive products in a sealed, low or near-zero $O_2$ environment. The assembly further defines a barrier between the fission products and the environment of the reactor containment vessel in order to mitigate release of the products into the broader containment space. In some cases, the assembly may be associated with one or more systems to purge the gas of the sealed volume of $O_2$ and to provide an inert gas to the sealed volume.

It will be appreciated that the assembly may be structurally configured in any appropriate manner adapted to provide a volume about certain points in the reactor system that may emit fission products. As one example, where the trap is configured to trap fission products emitted from a pipe connection, the assembly may be integrated with one or more pipe clamps in order to optionally define a seal between the assembly and one or more pipes that define the pipe connection. In another example, the assembly may be integrated with one or more flanges and gaskets in order to optionally define a seal between the gas-tight assembly and one or more components of a pump of the reactor system, such as defining a seal between an impeller housing and a pump motor of the pump. In other examples, other implementations of the assembly are contemplated herein, including implementations in which the assembly forms a gas-tight assembly.

Turning to the drawings, for purposes of illustration, FIG. 1 depicts a schematic representation of an example molten salt reactor system 100. The molten salt reactor system 100 may implement and include any of the fission product traps described herein. As will be understood and appreciated, the example shown in FIG. 1 represents merely one example environment in which the fission product traps may be utilized. It will be understood that the fission product traps described herein may be used in and with substantially any other environment or operating system, such as those associated with other systems in which fission products are emitted.

In various embodiments, a molten salt reactor system 100 utilizes fuel salt enriched with uranium (e.g., high-assay low-enriched uranium) to create thermal power via nuclear fission reactions. In at least one embodiment, the composition of the fuel salt may be $LiF—BeF_2—UF_4$, though other compositions of fuel salts may be utilized as fuel salts within the reactor system 100. The fuel salt within the system 100 is heated to high temperatures (about 700° C.) and melts as the system 100 is heated. In several embodiments, the molten salt reactor system 100 includes a reactor vessel 102 where the nuclear reactions occur within the molten fuel salt, a fuel salt pump 104 that pumps the molten fuel salt to a heat exchanger 106, such that the molten fuel salt re-enters the reactor vessel after flowing through the heat exchanger, and piping in between each component. The molten salt reactor system 100 may also include additional components, such as, but not limited to, drain tank 108 and reactor access vessel 110. The drain tank 108 may be configured to store the fuel salt once the fuel salt is in the reactor system 100 but in a subcritical state, and also acts as storage for the fuel salt if power is lost in the system 100. The reactor access vessel may be configured to allow for introduction of small pellets of uranium fluoride ($UF_4$) to the system 100 as necessary to bring the reactor to a critical state and compensate for depletion of fissile material.

In several examples, the fission product traps disclosed herein may be utilized to collect fission products emitted from a pipe connection and/or a pump shaft of the system 100. For example, a given fission product trap may be configured to capture fission products emitted from a pipe connection. Such fission product trap may therefore be arranged at a connection or juncture of any two pipes of the system 100, such as a connection of two pipes between the reactor vessel 102 and the reactor access vessel 110, a connection of two pipes between the reactor access vessel 110 and the reactor pump 104, a connection of two pipes between the reactor pump 104 and the heat exchanger 106, a connection of two pipes between the heat exchanger 106 and the drain tank 108, a connection of two pipes between the drain tank 108 and the reactor vessel 102, and/or substantially any other pipe connection of the system 100. As another example, a given fission product trap may be configured to capture fission products emitted from along a pump shaft, such as a shaft of the reactor pump 104. In this regard, such fission product traps may be arranged and integrated with the reactor pump 104 (or other pump) of the system 100. In other examples, the fission product traps disclosed herein may be integrated with any other assembly or component of the system 100 that may emit fission products, such as radioactive iodine.

Figure 2:
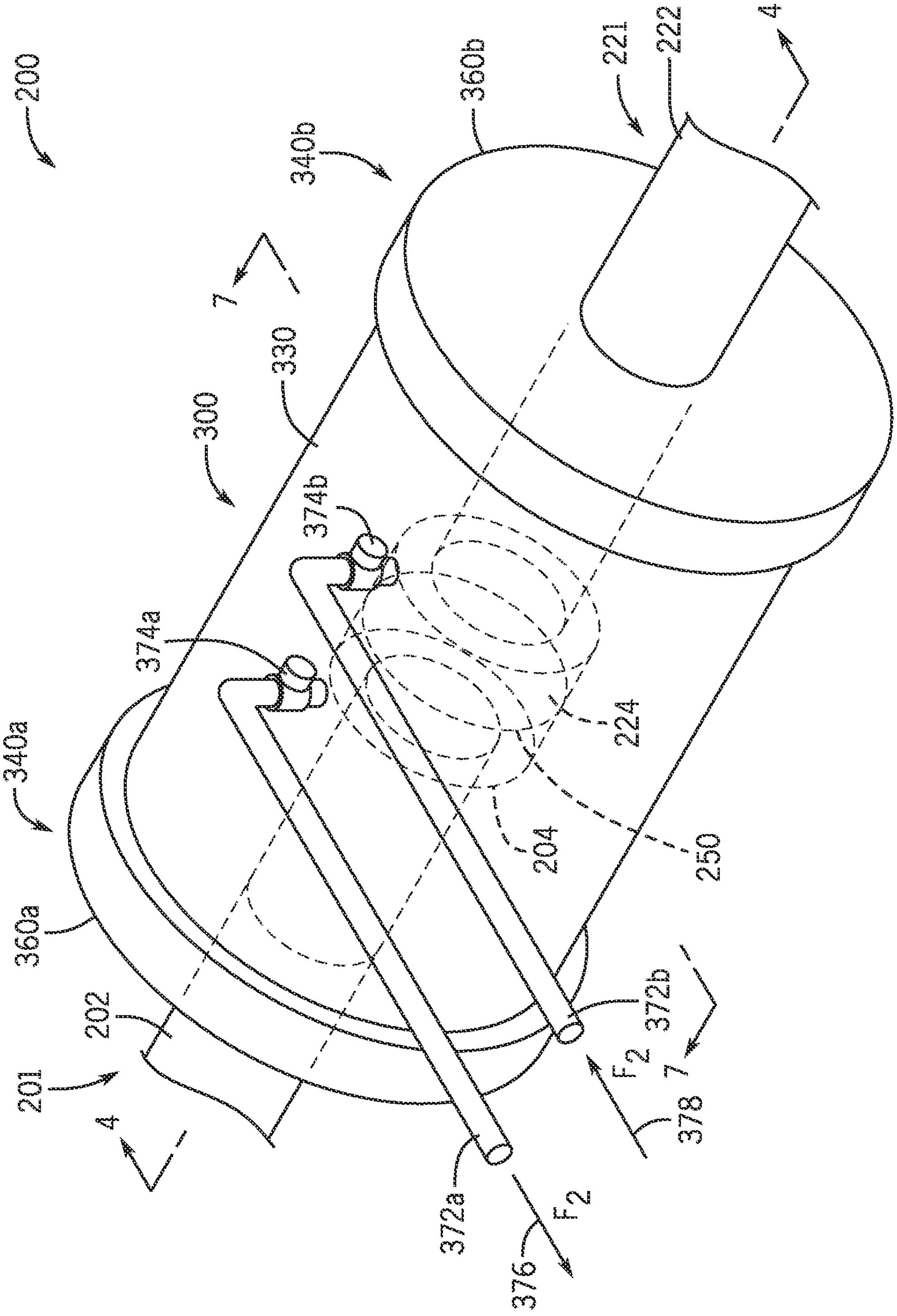
FIG. 2 depicts an isometric view of a system including an example fission product trap.
Figure 3:
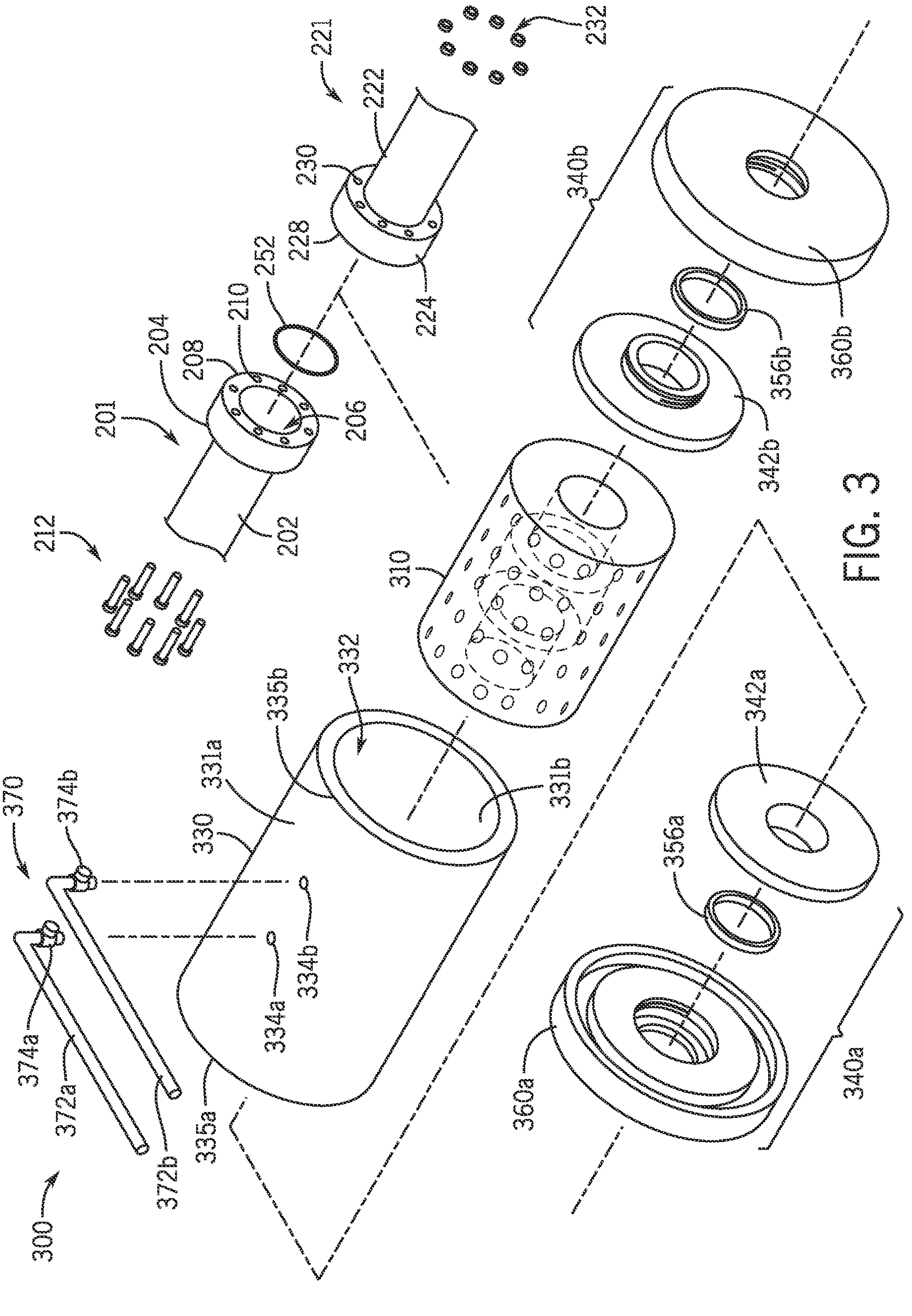
FIG. 3 depicts an exploded view of the system of FIG. 2.
Figure 4:
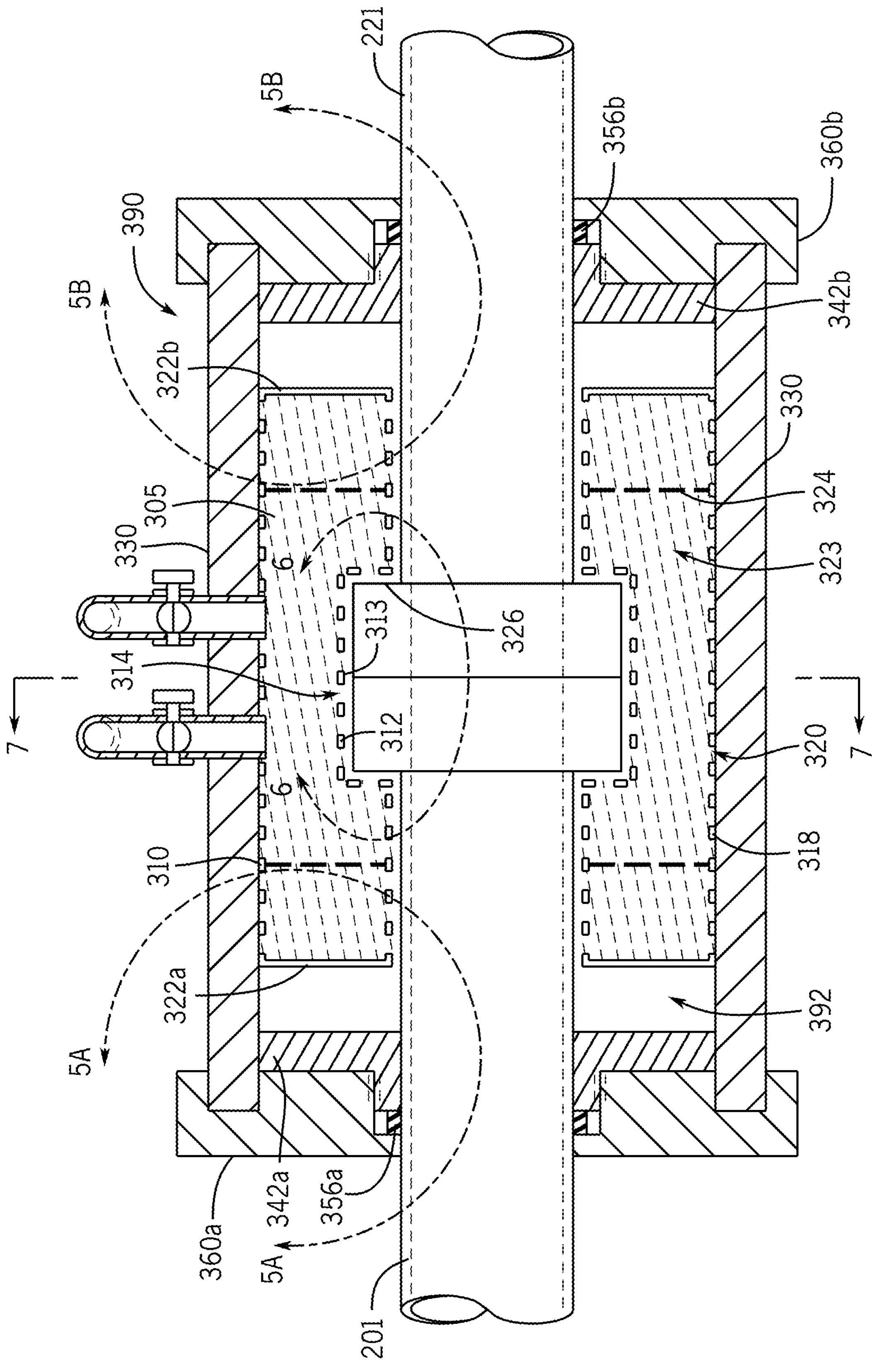
FIG. 4 depicts a cross-sectional view of the example fission product trap of FIG. 2, taken along line 4-4 of FIG. 2.

FIG. 2 depicts an isometric view of a system 200 including an example fission product trap 300. The system 200 may include a pipe connection or juncture of the system 100. The system 200, as illustrated in FIGS. 2-4, may include a first pipe 201 and a second pipe 221. The first and second pipes 201, 221 may be arranged abutting one another or otherwise arranged end-to-end in order to define a pipe connection 250 therebetween. In some cases, a gasket 252 may be arranged between the first and second pipes 201, 221 in order to establish the pipe connection 250 as being gasket-sealed. Notwithstanding the pipe connection 250 being sealed (including being optionally gasket-sealed), the pipe connection 250 may in some circumstances, emit fission products therefrom, such as emitting a radioactive iodine, tritium, tellurium, cesium, bromine and/or other fission products therefrom. The trap 300, as explained in greater detail herein, operates to trap fission products emitted from the pipe connection 250.

While the system 200 may include any appropriate arrangement of pipes, fittings, seals and the like based on the function of the system 200 with the reactor system 100, the system 200 is shown in FIGS. 2-4 with the first pipe 201 including a pipe segment 202 and a flange 204. The pipe segment 202 may have a generally tubular structure that defines a run or length of the pipe 201. The flange 204 may be coupled to an end of the pipe segment 202 and configured for removably securing the pipe 201 to another pipe. The pipe segment 202 and the flange 204 may cooperate to define a passage 206 therethrough. The passage 206 may be configured to carry a molten salt material at high temperature. FIGS. 2-4 further shown the first pipe 201 with the flange 204 defining a flange face 208 and flange holes 210 extending through the face 208 and being circumferentially spaced about the passage 206. The second pipe 221 may be substantially analogous to the first pipe 201 and include a pipe segment 222, a flange 224, a passage 226, a flange face 228, and flange holes 230.

In one example, the flange face 208 of the first pipe 201 and the flange face 228 of the second pipe 221 are arranged facing one another. The gasket 252 may be positioned between the flange faces 208, 228. In this regard, fasteners 212 may be positioned through corresponding holes of the flange holes 210 of the first pipe 201 and flange holes 230 of the second pipe 221. Nuts 232 or other securing elements may in turn, be threadably engaged with the fasteners 212 in order to encourage the faces 208, 228 toward one another and to compress the gasket 252 therebetween. The compression of the gasket 252 between the faces 208, 228 may define a gasket-sealed connection between the pipes 201, 221 at the pipe connection 250.

While the example of FIGS. 2-4 shows the pipes 201, 221 as being gasket-sealed to one another, in other cases, the pipes 201, 221 may be welded to one another. For the sake of non-limiting illustration, the flanges 204, 224 of each of the pipes 201, 221 may be omitted. In turn, the ends of each of the respective pipe segments 202, 222 may be welded to one another in order to establish the pipe connection 250 as a welded connection or welded seal. In this regard, while FIGS. 2-4 show and describe the fission product trap as being configured to trap fission products that are emitted from a gasket-sealed pipe connection, in other cases, as contemplated herein, the fission product trap may be configured to trap fission products from a welded connection.

As shown in FIGS. 3 and 4, the fission product trap 300 may broadly include a porous container 310 and an assembly 390. The porous container 310 is configured for mounting about the pipe connection 250 and has an absorbing material 305 contained therein. The absorbing material 305 may be loose activated carbon, silver zeolite, carbon nanostructures, or other materials of various structural configurations that are configured to collect and trap fission products therein, such as collecting and trapping a radioactive iodine (and/or other fission products) from the pipe connection 250. The assembly 390 may include a collection of components, as described in greater detail below, that collectively operate to define a volume 392 about the porous container 310 and the pipe connection 250. In this regard, the absorbing material 305 may operate to collect the fission products emitted from the pipe connection 250, and the assembly 390 may operate to mitigate the release of any fission products or gasses from the region of the absorbing material 305 by optionally defining a gas-tight barrier about the pipe connection 250.

The porous container 310 may operate to define a basket or holding structure for the absorbing material 305 that also permits the intrusion of fission products into the container 310 such that fission products may be collected to absorbing material 305. In one example, the porous container 310 may include an inner shell 312, an outer shell 318, and end pieces 322*a*, 322*b*. Broadly, the inner shell 312, the outer shell 318, and the ends pieces 322*a*, 322*b* may collectively define cylindrical-type structure that fits about and generally encompasses the pipe connection 250. For example, the inner shell 312 may include one or more material sections that define an interior surface 313 of the porous container 310. Ends of the cylindrical-type shape defined by the porous container may be established by the end pieces 322*a*, 322*b*. The inner shell 312, the outer shell 318, and the end pieces 322*a*, 322*b* may cooperate to define a holding space 323 of the porous container 310. The holding space 323 may be configured to house the absorbing material 305 therein, including being configured to house a sufficient amount of absorbing material 305 in order for the absorbing material 305 to collectively be capable of trapping fission products for a period of years, such as a period of one year, a period of three years, a period of five years, or longer. Optional internal supports 324 may be arranged within the holding space 323 in order to connect the inner shell 312, the outer shell 318, and the end pieces 322*a*, 322*b* to one another. In some cases, fasteners of various types may also be used to couple the inner shell 312, the outer shell 318, and the end pieces 322*a*, 322*b* to one another.

The inner shell 312 may define a plurality of holes 314 through a thickness of the material that defines the inner shell 312. Each hole of the plurality of holes 314 may have a hole diameter 315, as shown in greater detail with reference to FIGS. 6 and 6A herein. The hole diameter 315 may be sized in order to permit passage of (and adequate flow of) fission products through the inner shell 312 for absorption by the absorbing material 305. The hole diameter 315 may further be sized in order to contain the absorbing material 305 in the porous container 310 such that absorbing material 305 is not readily released therefrom. The outer shell 318 may define an outer surface having a plurality of holes 320 have similar properties and dimensions as the plurality of holes 314 of the inner shell 312. While the plurality of holes 314, 320 are shown in FIGS. 3 and 4 as having a generally consistent size and shape, this is not required. It will be appreciated that the holes of the plurality of holes 314, 320 may be of any sufficient size and shape, including non-uniform and non-symmetrical shapes, any of which may or may not be uniformly distributed along the material of the respective shells.

Figure 5A:
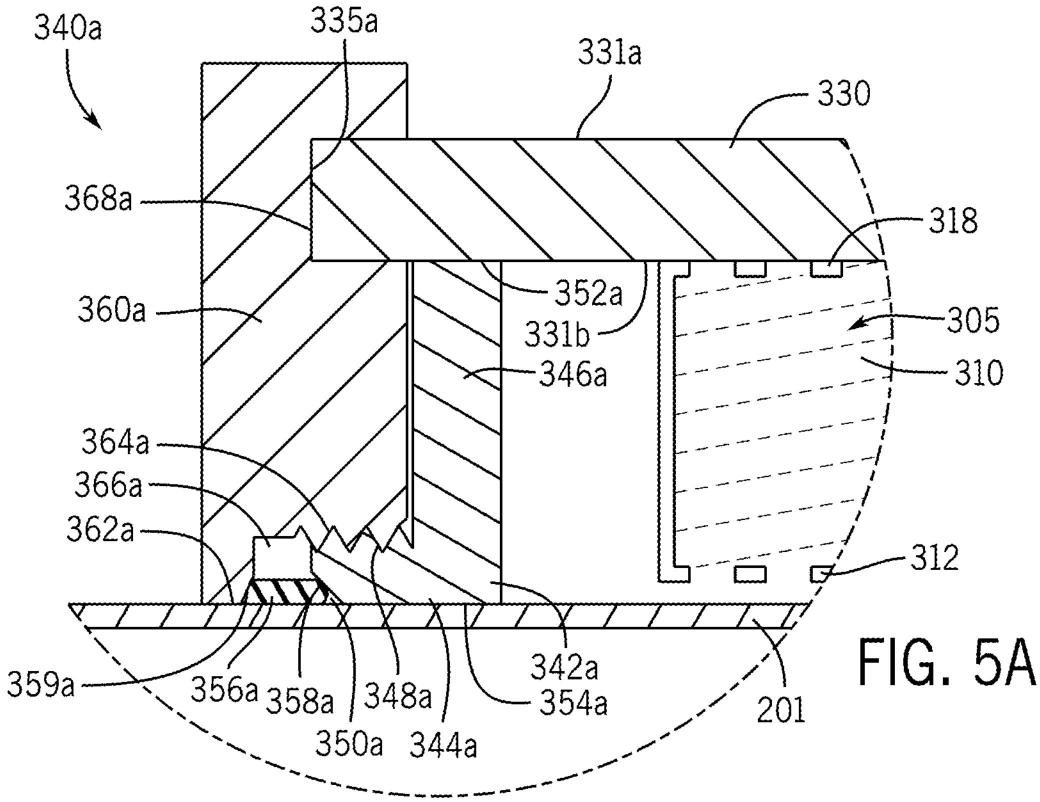
FIG. 5A depicts detail 5A-5A of FIG. 4.
Figure 5B:
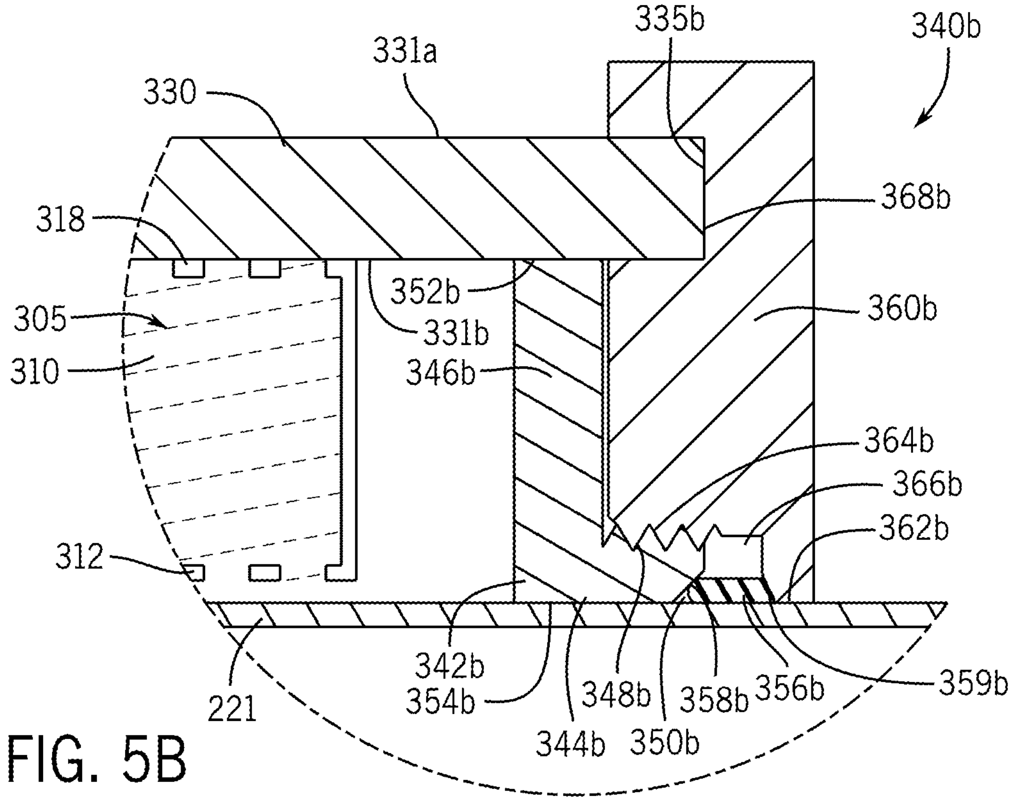
FIG. 5B depicts detail 5B-5B of FIG. 4.
Figure 6:
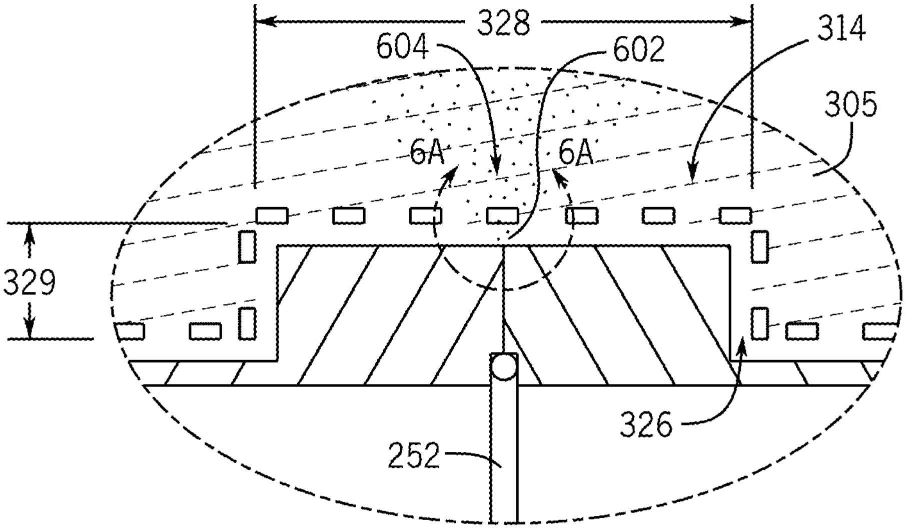
FIG. 6 depicts detail 6-6 of FIG. 4

With reference to FIGS. 4 and 6, the porous container 310 is also shown as including a recessed band 326. The recessed band 326 may be configured to receive some or all of the pipe connection 250. For example, the recessed band 326 may be configured to fit around an entire periphery of the pipe connection 250 such that the pipe connection 250 fits within and is fully encompassed about its perimeter by the porous container 310. The size and shape of the recessed band 326 may be adapted based on the size, shape and service of pipe connection about which the trap 300 is mounted. In the example of FIGS. 4-7, the recessed band 326 may be a generally cylindrical void having an axial dimension 328 and a radial dimension 329. The axial dimension 328 may be configured to correspond to the collective thickness of the flanges 204, 224, describe above, such that both flanges 204, 224 may fit at least partially within the recessed band 326. Further, the radial dimension 329 may be configured to correspond to the radial dimension of the flanges 204, 224 (relative to an outer surface of the pipe segments 202, 222) in order to further accommodate fitting both flanges 204, 224 at least partially within the recessed band 326.

Figure 7:
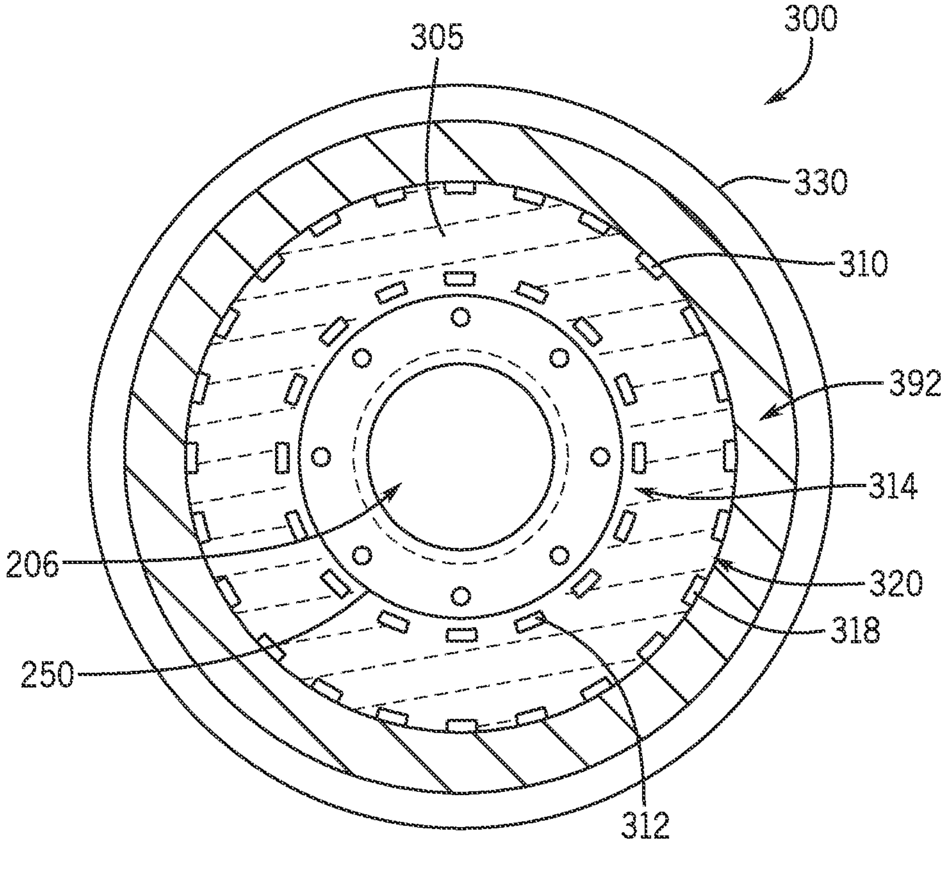
FIG. 7 depicts a cross-sectional view of the example fission product trap of FIG. 2, taken along line 7-7 of FIG. 2.

As described herein, the porous container 310 may be enclosed in a volume 392 that is defined by the assembly 390. The assembly 390 may include any appropriate combination of components and subassemblies appropriate to form and maintain the volume 392 about the porous container 310, including components and subassemblies that operate to form the volume 392 as a sealed volume. In the example of FIGS. 4-7, the assembly 390 is shown as including a sleeve 330 and a pair of clamping assemblies, such as a first clamping assembly 340*a* and a second clamping assembly 340*b*. The sleeve 330 may be a pipe segment other cylindrical structure that operates to form a jacket about the porous container 310. For example, and as shown in FIGS. 3 and 7, the sleeve 340 may define an outer surface 331*a*, an inner surface 331*b*, and an inner volume 332 running along the inner surface 331*b*. The sleeve 330 may be further defined by first and second sleeve ends 335*a*, 335*b* that define terminal opposing ends of the sleeve 330. The sleeve 330 is further shown as including first and second ports 334*a*, 334*b*. The first and second ports 334*a*, 334*b* may be couplable with certain valving and tubing, as described in greater detail below, in order to permit purging of the volume 392 with an inert gas.

With reference to FIGS. 3 and 5A, the first clamping assembly 340*a* is shown as including a clamping shaft 342*a*, a gripping element 356*a*, and a clamping nut 360*a*. The clamping shaft 342*a*, the gripping element 356*a*, and the clamping nut 360*a* may cooperate to define a sealed connection between the first sleeve end 335*a* and a pipe (e.g., pipe 201) of a pipe connection (e.g., of the pipe connection 250). With reference to the clamping shaft 342*a*, the clamping shaft 342*a* is shown as including a shaft portion 344*a* and a radial portion 346*a*. The shaft portion 344*a* may be a tubular structure having an axial passage 354*a* that is configured to fit onto (including forming a press fit with) the example pipe of the pipe connection. The shaft portion 344*a* may further include a threaded outer surface 348*a*. The threaded outer surface 348*a* may extend about a complete periphery of the shaft portion 344*a*. The shaft portion 344*a* may further include a nose portion that defines a wedge feature 350*a*. The wedge feature 350*a* may be a contoured surface or tip of the shaft portion 344*a* that is configured to engage the gripping element 356*a* for forming the sealed connection between the pipe and sleeve 330, as described in greater detail herein. The radial portion 346*a* may extend integrally from the shaft portion 344*a* and radially away from the axial passage 354*a*. The radial portion 346*a* may include a ledge 352*a* to facilitate seating of the sleeve 330 on the first clamping assembly 340*a*, as described herein.

With continued reference to FIGS. 4-6, the first clamping assembly 340*a* is further shown including the gripping element 356*a*. The gripping element 356*a* may be a cylindrical or ring-like component that operates to grip into the pipe upon the movement of the clamping shaft 342*a* and the clamping nut 360*a* toward one another in order to facilitate the establishment of the sealed connection between the pipe and the sleeve 330. For example, the gripping element 356*a* is shown as including a first engagement surface 358*a* and a second engagement surface 359*a*. The first engagement surface 358*a* may be configured to engage a portion of the clamping shaft 342, whereas the second engagement surface 359*a* may be configured to engage a portion of the clamping nut 360*a*. The first and second engagement surfaces 358*a*, 359*a* may be tailored or contoured such that that movement of the clamping shaft 342 and the clamping nut 360*a* toward one another encourages one of the first or the second engagement surfaces 358*a*, 359*a* to move toward, and optionally partially into, the pipe for forming the sealed connection described herein.

The clamping assembly 340*a* is further shown as including the clamping nut 360*a*. The clamping nut 360*a* may define a passage 362*a* therethrough having complementary threads 364*a* therein. The clamping nut 360*a* is further shown as having a wedge feature 366*a* arranged in the passage 362*a* and being configured for engagement with the gripping element 356*a*. The clamping nut 360*a* is further shown as including a receiving cut 368*a* configured for receiving the sleeve 330 therein. The receiving cut 368*a* may extend about a complete periphery of the clamping nut 360*a*.

It will be appreciated that the second clamping assembly 340*b* may be substantially analogous to the first clamping assembly 340*a*, as shown in FIG. 5B, and may therefore include: a clamping shaft 342*b*, a shaft portion 344*b*, a radial portion 346*b*, a threaded outer surface 348*b*, a wedge feature 350*b*, a ledge 352*b*, an axial passage 354*b*, a gripping element 356*b*, a first engagement surface 358*b*, a second engagement surface 359*b*, a clamping nut 360*b*, a passage 362*b*, complementary threads 364*b*, a wedge feature 366*b*, and a receiving cut 368*b*; redundant explanation of which is omitted here for clarity.

With reference to FIGS. 3 and 4, the trap 300 is further shown as including or otherwise being associated with a gas management system 370. The gas management system 370 may operate generally to purge the volume 392 of oxygen and to replace the oxygen with an inert gas. In the example of FIGS. 3 and 4, the gas management system 370 is shown as including tubing 372*a*, 372*b* with corresponding valves 374*a*, 374*b*. In one example, the tubing 372*a* and corresponding valve 374*a* may be coupled with the volume 392 via the first port 334*a*. The tubing 372*a* may be coupled with a vacuum system or the like that is configured to draw a vacuum flow 376 from the volume 392 in order to remove oxygen from the volume 392. Further, the tubing 372*b* and corresponding valve 374*b* may be coupled with the volume 392 via the second port 344*b*. The tubing 372*b* may be coupled with an inert gas source or the like that is configured to provide an inert gas flow 378 to the volume 392.

The trap 300 may be coupled such that the porous container 310 is mounted about the pipe connection 250. For example, porous container 310 may be positioned adjacent the pipe connection with the flanges 204, 224 being received by and at least partially into the recessed band 326 of the porous container 310. In some cases, as described herein, the porous container 310 may be a multi-component or composite structure that is formed by snapping or fastening individual components (e.g., various shells, end pieces, and internal supports) to one another. In this regard, it will be appreciated that in some examples, the trap 300 is coupled with the pipe connection 250 by arranging a portion of the porous container 310, such a portion of the inner shell 312 about the pipe connection 250. The absorbing material 305 may be arranged about the inner shell 312 and enclosed in the holding space 323 of the porous container may connecting additional portions of the porous container 310 to one another to define the completed structure. In this regard, the porous container 310 can be assembled over the pipe connection 250 without necessarily separating the pipes of the pipe connection 250 from one another.

The trap 300 may be further coupled by assembling the assembly 390 about the porous container 310 and the pipe connection 250. For example, the sleeve 330 may be slid over the porous container 310 and the pipe connection 250 such that the porous container 310 and the pipe connection 250 are arranged entirely with the inner volume 332 of the sleeve 330. The sleeve 330 may in turn be sealed to the first pipe 201 via the first clamping assembly 340*a*, and may be sealed to the second pipe 221 via the second clamping assembly 340*b*. The sealing of the sleeve 330 to the first pipe 201 and the second pipe 221 may establish the volume 392 about the porous container 310 and the pipe connection 250.

To facilitate the establishment of the volume 392, and as shown in FIG. 5 with respect to the first clamping assembly 340*a*, the shaft portion 344*a* may receive the pipe 201 within and through the axial passage 354*a*. The sleeve 330 may rest on the radial portion 346*a* of the clamping shaft 342*a*, such as sitting on the ledge 352*a*. The gripping element 356*a* is arranged on the pipe 201 such that the first engagement surface 358*a* of the gripping element 356*a* is positioned adjacent the wedge feature 350*a* of the clamping shaft 342*a*. Further, the clamping nut 360*a* is arranged such that the pipe 201 is received by passage 362*a*. The clamping nut 360*a* is advanced along the pipe 201 to receive the first end 335*a* of the sleeve in the receiving cut 368*a*. The clamping nut 360*a* is further advanced along the pipe 201 to threadably engage the complementary threads 364*a* with the threaded outer surface 348*a* of the clamping shaft 342*a*. The clamping nut 360*a* is further advanced along the pipe 201 so that the wedge feature 366*a* is positioned adjacent the second engagement surface 359*a* of the gripping element 356. The clamping nut 360*a* may be threadably engaged with the clamping shaft 342*a* in manner that causes the clamping shaft 342*a* and the clamping nut 360*a* to move toward one another. Upon the clamping shaft 342*a* and the clamping nut 360*a* moving toward one another, the sleeve 330 may be encouraged to move deeper into the receiving cut 368*a*. Further upon the clamping shaft 342*a* and the clamping nut 360*a* moving toward one another, the wedge feature 350*a* of the clamping shaft 342*a* may engage the first engagement surface 358*a* of the gripping element 356*a* and the wedge feature 366*a* of the clamping nut 360*a* may engage the second engagement surface 359*a* of the gripping element 356*a* such that the gripping element 356*a* is compressed therebetween. The first and second engagement surfaces 358*a*, 359*a* may be configured such that the compression of the gripping element 356*a* in this regard encourages at least one of the first or second engagement surface 358*a*, 358*b* toward an outer surface of the pipe in order to define a seal therewith. It will be appreciated that the second clamping assembly 340*b* may operate to establish a seal between the sleeve 330 and the pipe in a substantially analogous manner. In other examples, other types and configurations of a clamp seal may be used to establish one or both of the seals between the sleeve 330 and the respective pipe, including examples in which one or both of the gripping elements 356*a*, 356*b* may be omitted.

Figure 6A:
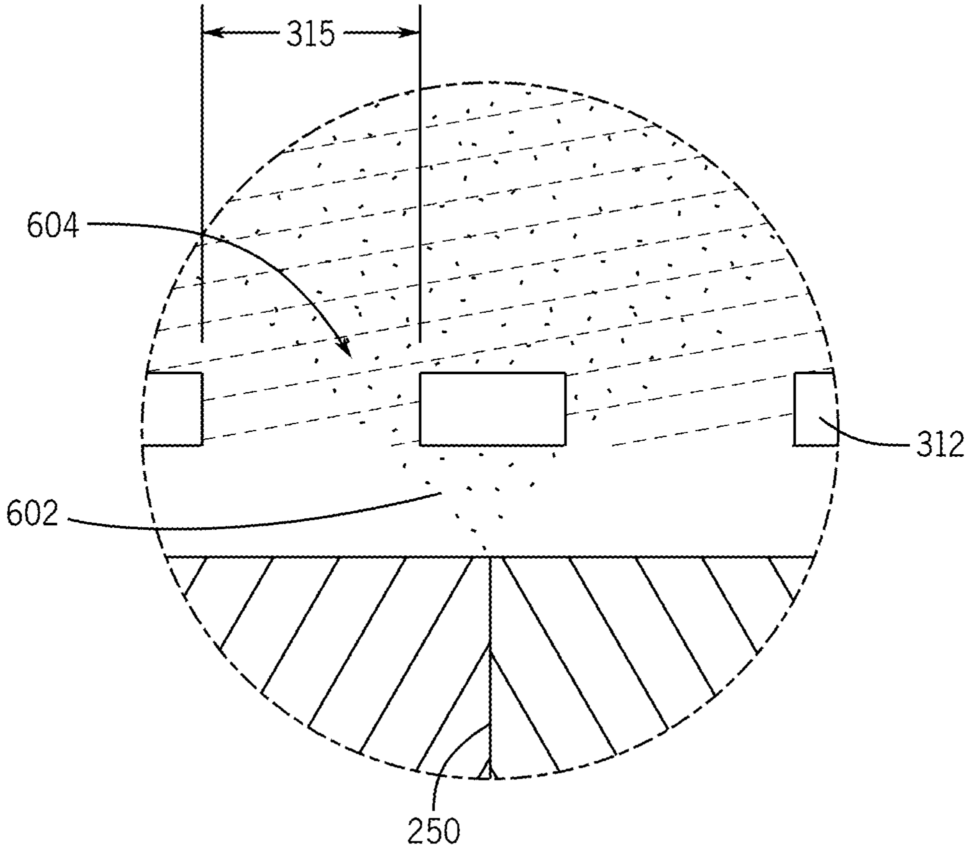
FIG. 6A depicts detail 6A-6A of FIG. 6.

In operation, and as shown in relation to FIGS. 6 and 6A, radioactive iodine 602 (and/or other fission product, including, without limitation tritium, tellurium, cesium, or bromine) may be emitted from the pipe connection 250. The porous container 310 including the absorbent material 305 may be position adjacent the pipe connection 250. In this regard, the radioactive iodine 602 may travel from the pipe connection 250 and toward the porous container 310. The radioactive iodine 602 may enter the porous container 310 via the plurality of inner holes 314. As shown in FIG. 6A, the radioactive iodine 602 may define a gradient 604 such that the radioactive iodine 602 is dispersed within and collected by the absorbing material 305. By collecting the radioactive iodine 602 in the absorbing material 305, the fission product trap 300 may operate to reduce the release of fission products into the broader containment vessel or region of the reactor system.

Figure 8:
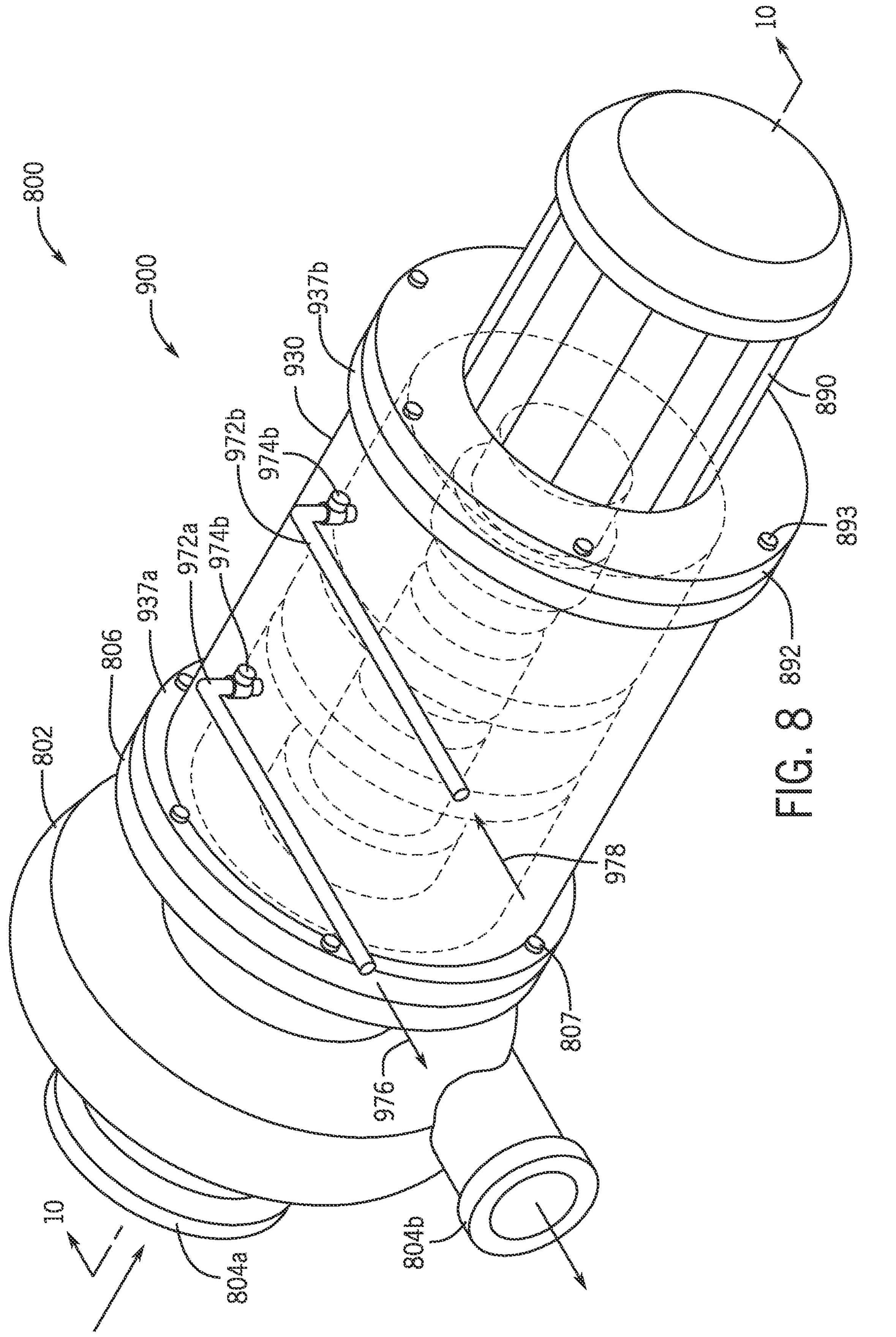
FIG. 8 depicts an isometric view of another system including another example fission product trap.
Figure 9:
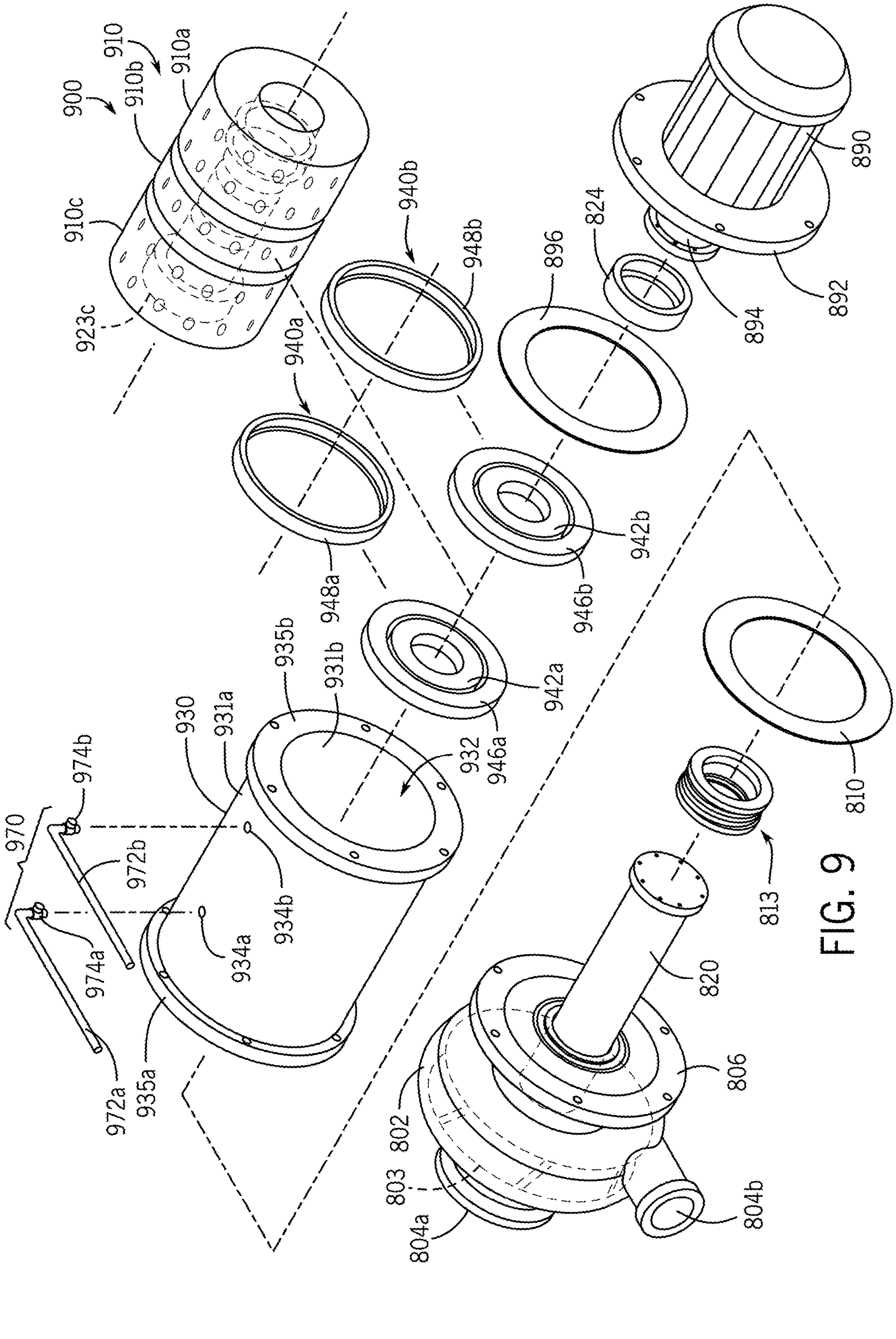
FIG. 9 depicts an exploded view of the system of FIG. 8.
Figure 9A:
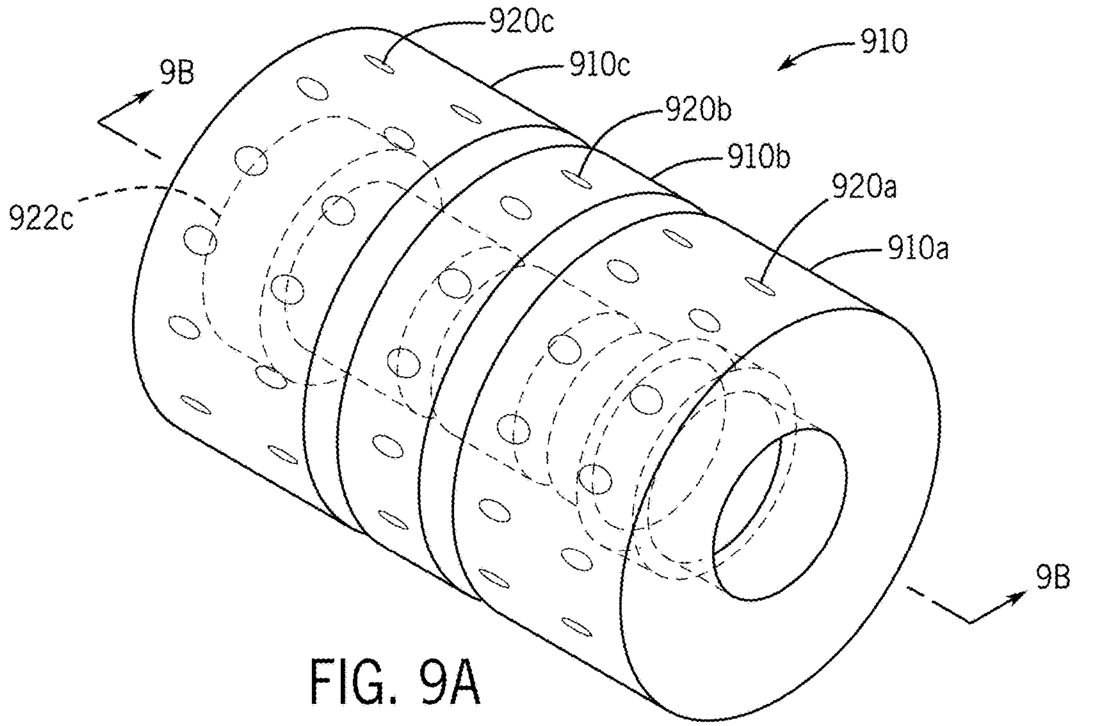
FIG. 9A depicts a porous container of the fission product trap of FIG. 9.
Figure 10:
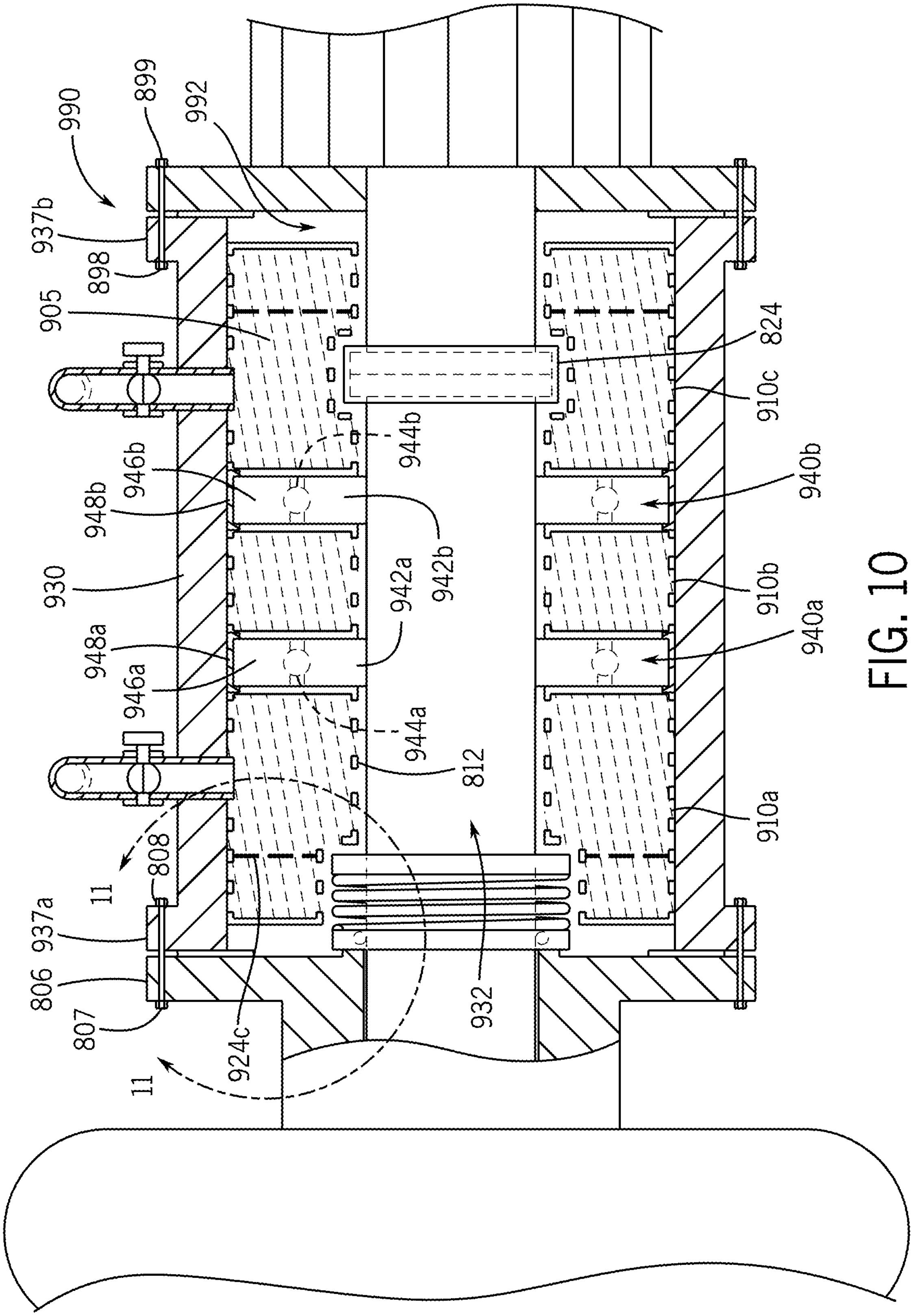
FIG. 10 depicts a cross-sectional view of the example fission product trap of FIG. 8, take along line 10-10 of FIG. 8.

Turning to another example, FIG. 8 depicts an isometric view of a system 800 including an example fission product trap 900. The system 800 may be or include one or more components associated with the pump 104 of the system 100 shown in FIG. 1. Broadly, and as shown in FIGS. 8-10, the fission product trap 900 may be operable to collect and capture fission products emitted from one or more components of the system 800, such as fission products emitted from along a pump shaft or mechanical seal, as described herein. The system 800, as illustrated in FIGS. 8-10, may include at least an impeller housing 802, a mechanical seal 812, a pump shaft 820, a coupler 824, a motor shaft 894, and a pump motor 890. The pump motor 890 may operate to rotate the motor shaft 894. The rotation of the motor shaft 894 may cause a corresponding rotation of the coupler 824 and the pump shaft 820. The pump shaft 820 may extend through the mechanical seal 812, and rotate therein, with such rotation of the pump shaft 820 causing a corresponding rotation of an impeller arranged within the impeller housing 802. The impeller housing 802 may contain material, such as a molten salt or other material, which may exhibit radioactive properties. Accordingly, it will be appreciated that fission products could be emitted from several points in the system 800 such as from the mechanical seal 812 and/or along the pump shaft 820, such as any of the fission products contemplated herein. The trap 900 described herein is configured to mount about the pump shaft 820 (including mounting about the mechanical seal 812) in order to capture fission products at the source and to mitigate the buildup of fission products within a containment vessel or other containment structure of the reactor system.

While the system 800 may include any appropriate arrangement of components, subassemblies, pipes, fittings, and the like based on the function and configuration of the pump, the system 800 is shown in FIGS. 8-10 with the impeller housing 802 embodied as a centrifugal pump. It will be appreciated that the trap 900 disclosed herein is not limited to being arranged with centrifugal pumps, and may be adapted to any appropriate pump that is implemented with the reactor system 100, according to the techniques described herein. In the example of FIGS. 8-10, the impeller housing 802 is shown defining an impeller housing volume 803. The pump shaft 820 may extend into the impeller housing volume 803 and mount with an impeller therein in order to facilitate increasing a pressure of a fluid passing through the impeller housing 802. The impeller housing 802 is further shown in FIGS. 8 and 9 for purposes of illustration as including fluid connections 804*a*, 804*b*, which may include flanges, and that define a respective inlet and outlet for process fluid being pumped through the impeller housing 802. The impeller housing 802 is further shown as including a housing flange 806. As described in greater detail herein, the housing flange 806 may be configured to define a mount for the trap 900.

Figure 11:
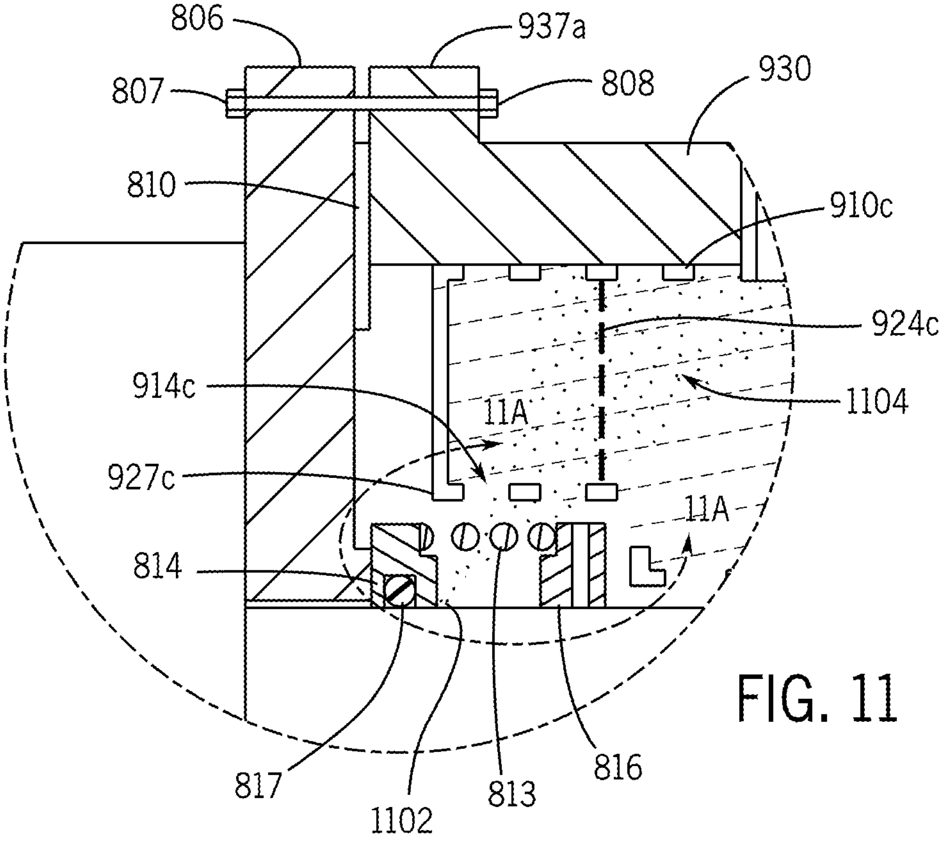
FIG. 11 depicts detail 11-11 of FIG. 10.

As shown in relation to FIGS. 10 and 11, the system 800 includes the mechanical seal 812 adjacent the impeller housing 802 and outside of the impeller volume 803. The mechanical seal 812 is shown in FIGS. 9 and 10 as including a first subassembly 814, a second subassembly 816, a biasing element 813, and a sealing element 817. The first and second subassemblies 814, 816 may cooperate to define a shaft-type seal about the pump shaft 820 that forms a liquid- and gas-tight barrier between the impeller housing volume 803 and the pump shaft 820. The first and second subassemblies 814, 816 may further be configured to maintain such liquid- and gas-tight barrier while the pump shaft 820 rotates. As one example, the biasing element 813 may bias the subassemblies 814, 816 away from one another and cause the sealing element 817 to maintain pressure on the shaft 820 while the shaft 820 rotates, thereby maintaining the shaft seal during operation. It will be appreciated that the components of the mechanical seal 812 are presented for purposes of illustration; any appropriate mechanical shaft-type seal may be used. Example types of mechanical seal which may be used include, without limitation, balanced seals, unbalanced sealed, pusher seals, non-pusher seals, conventional seals, cartridge seals, among other possibilities.

As shown in FIGS. 9-10, the fission product trap 900 may broadly include a porous container 910 and an assembly 990. The porous container 910 is configured for mounting about the pump shaft 820 and has an absorbing material 905 contained therein. The absorbing material 905 may be loose activated carbon, silver zeolite, and/or carbon nanostructure and/or other material that is configured to collect and trap fission products therein, such as collecting and trapping a radioactive iodine (or other fission product) that is emitted generally from along the pump shaft 820. The assembly 990 may include a collection of components, as described in greater detail below, that collectively operate to define a volume 992 about the porous container 910 and the pump shaft 820. In this regard, the absorbing material 905 may operate to collection the fission products emitted from along the pump shaft 820, and the assembly 990 may operate to mitigate the release of any fission products or gasses from the region of the absorbing material 905.

Figure 9B:
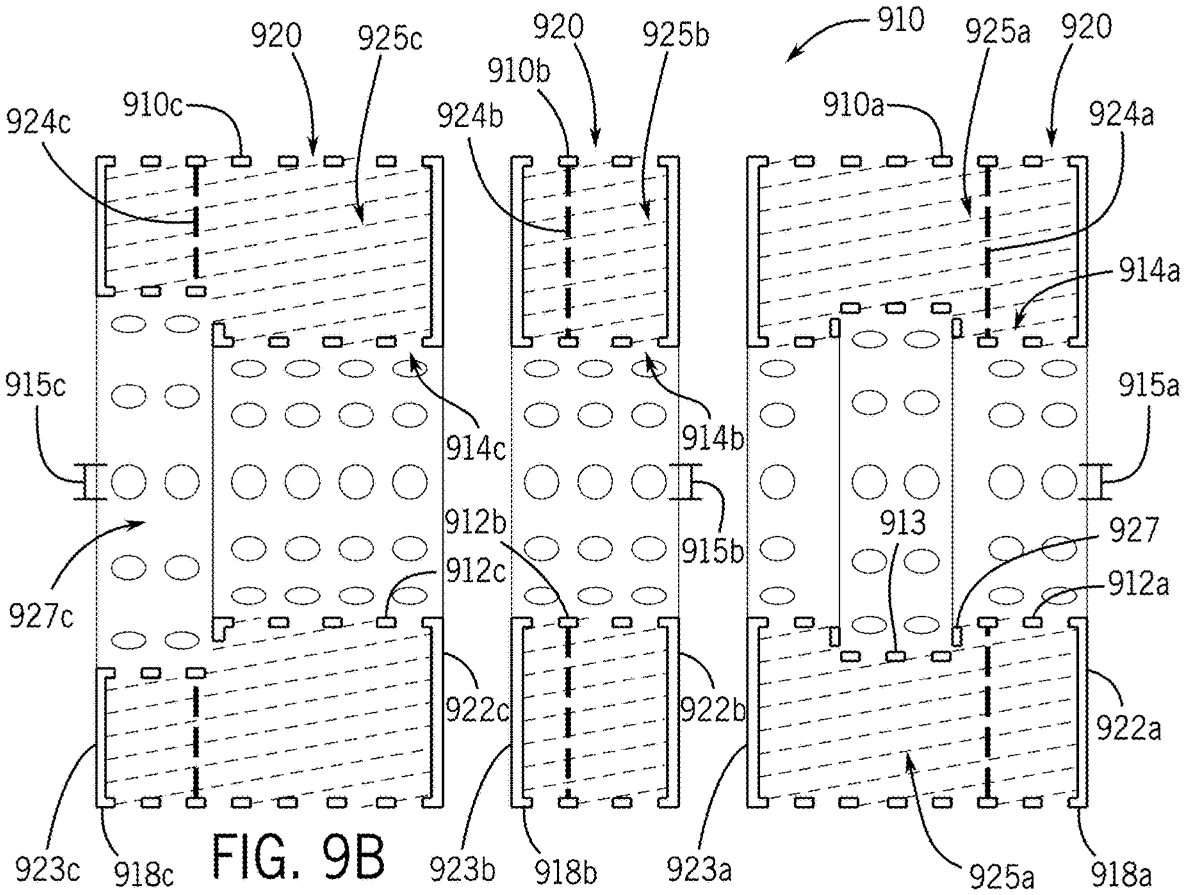
FIG. 9B depicts a cross-sectional view of the porous container of FIG. 9A, taken along line 9B-9B of FIG. 9A.

The porous container 910 may operate to define a basket or holding structure for the absorbing material 905 that also permits the intrusion of fission products into the container 910 such that fission products may be collected to absorbing material 905. The porous container 910 may be constructed in a manner that accommodates the configuration and components of the pump with which the porous container is arranged. In the example of FIGS. 9-10, the porous container 910 is shown as a multi-piece container including three sub-containers, e.g., a first sub-container 910*a*, a second sub-container 910*b*, and a third sub-container 910*c*. In other cases, more or fewer sub-containers may be used. Each of the sub-containers 910*a*-910*c* may have a generally similar construction in which each of the sub-containers 910*a*-910*c* defines a cylindrical shape that holds a subset of the absorbing material 905 with a porous material. For example, and with reference to the first sub-container 910*a*, the first sub-container 910*a* may include an inner shell 912*a*, an outer shell 918*a*, and end pieces 922*a*, 923*a*. Broadly, the inner shell 912*a*, the outer shell 918*a*, and the ends pieces 922*a*, 923*a* may collectively define cylindrical-type structure that fits about and generally encompasses a portion of the pump shaft 820. For example, the inner shell 912*a* may include one or more material sections that define an interior surface 913 of the porous container 910*a*. Ends of the cylindrical-type shape defined by the porous container may be established by the end pieces 922*a*, 923*a*. The inner shell 912*a*, the outer shell 918*a*, and the end pieces 922*a*, 923*a* may cooperate to define a holding space 925*a* of the porous container 910*a*. The holding space 925*a* may be configured to house the absorbing material 905 therein, including being configured to house a sufficient amount of absorbing material 905 in order for the absorbing material 905 to collectively be capable of trapping fission products for a period of years, such as a period of one year, a period of three years, a period of five years, or longer. Optional internal supports 924*a* may be arranged within the holding space 925*a* in order to connect the inner shell 912*a*, the outer shell 918*a*, and the end pieces 922*a*, 923*a* to one another. In some cases, fasteners of various types may also be used to couple the inner shell 912*a*, the outer shell 918*a*, and the end pieces 922*a*, 923*a* to one another. As further shown, with reference to FIG. 9B, the first sub container 910*c* may further include a recessed band 327*a* that is configured to receive a portion of the coupler 824.

With continued reference to the first sub-container 910*a*, the inner shell 912*a* may define a plurality of holes 914*a* through a thickness of the material that defines the inner shell 912*a*. Each hole of the plurality of holes 914*a* may have a hole diameter 915*a*. The holes diameter 915*a* may be sized in order to permit passage of (and adequate flow of) fission products through the inner shell 912*a* for absorption by the absorbing material 905. The hole diameter 915 may further be sized in order to contain the absorbing material in the porous container 910*a* such that absorbing material 905 is not readily released therefrom. The outer shell 918*a* may define an outer surface having a plurality of holes 920*a* have similar properties and dimensions as the plurality of holes 914*a* of the inner shell 912*a*. While the plurality of holes 914*a*, 920*a* are shown in FIGS. 9 and 10 as having a generally consistent size and shape, this is not required. It will be appreciated that the holes of the plurality of holes 914*a*, 920*a* may be of any sufficient size and shape, including non-uniform and non-symmetrical shapes, any of which may or may not uniformly distributed along the material of the respective shells.

The second sub-container 910*b* may be substantially analogous to the first sub-container 910*a* and include: an inner shell 912*b*, an outer shell 918*b*, end pieces 922*b*, 923*b*, holding space 925*b*, optional internal supports 924*b*, a plurality of holes 914*b*, a hole diameter 915*b*, and a plurality of holes 920*b*; redundant explanation of which is omitted here for clarity. Further, the third sub-container 910*c* may be substantially analogous to the first sub-container 910*a* and include: an inner shell 912*c*, an outer shell 918*c*, end pieces 922*c*, 923*c*, holding space 925*c*, optional internal supports 924*c*, a plurality of holes 914*c*, a hole diameter 915*c*, and a plurality of holes 920*c*; redundant explanation of which is omitted here for clarity.

Notwithstanding the foregoing similarities, the third sub-container 910*c* may be configured such that one end of the third sub-container is adapted to fit over the mechanical seal 812. For example, and as shown in FIG. 10, the end piece 923*c* of the third sub-container 910*c* may be configured with an annular seat 927*c* that is configured to receive the mechanical seal 812. By receiving at least some of the mechanical seal 812 within the third sub-container 910*c*, the absorbing material 905 may be arranged about an entire periphery of the mechanical seal 812. Arranging the absorbing material 905 about an entire periphery of the mechanical seal 812 may increase the amount of fission products captured by the trap 900 at the mechanical seal 812, which represents a potential source of emissions of the fission products.

As described herein, the porous container 910 may be enclosed in a volume 992 that is defined by the assembly 990, such as optionally a sealed volumed. The assembly 990 may include any appropriate combination of components and sub-assemblies appropriate to form and maintain the volume 992 about the porous container 910. In the example of FIGS. 9 and 10, the assembly 990 is shown as including a sleeve 930 and flanges 937*a*, 937*b*. The sleeve 930 may be a pipe segment other cylindrical structure that operates to form a jacket about the porous container 910. For example, and as shown in FIGS. 9 and 10, the sleeve 930 may define an outer surface 931*a*, an inner surface 931*b*, and an inner volume 932 running along the inner surface 931*b*. The sleeve 930 may be further defined by first and second sleeve ends 935*a*, 935*b* that define terminal opposing ends of the sleeve 930. The sleeve 930 is further shown as including first and second ports 934*a*, 934*b*. The first and second ports 934*a*, 934*b* may be couplable with certain valving and tubing, as described in greater detail below, in order to permit purging of the volume 992 with an inert gas. The sleeve 930 may be coupled with the flange 937*a* at the first sleeve end 935*a*. Further, the sleeve 930 may be coupled with the flange 937*b* at the second sleeve end 935*b*.

The assembly 990 may be coupled such that the sleeve 930 is coupled to each of the impeller housing flange 806 and the motor flange 892. For example, the flange 937*a* may be arranged adjacent the impeller housing flange 806 with a gasket 810 disposed therebetween. Fasteners 807 and corresponding nuts 808 may be associated with the flanges 937*a* and the flange 806 and used to encourage the flange 937*a* and flange 806 toward one another to compress the gasket 810 therebetween, thereby establishing a gasket-sealed connection between the sleeve 830 and the impeller housing 802. Further, the flange 937*b* may be arranged adjacent the motor flange 892 with a gasket 896 disposed therebetween. Fasteners 898 and corresponding nuts 899 may be associated with the flanges 937*b* and the flange 892 and used to encourage the flange 937*b* and flange 892 toward one another to compress the gasket 896 therebetween, thereby establishing a gasket-sealed connection between the sleeve 830 and the pump motor 890.

The trap 900 is further shown in FIGS. 9 and 10 as including a pair of bearings, such as a first bearing 940*a* and a second bearing 940*b*. Each bearing of the pair of bearings may generally be any type of bearing that permits free rotational movement of the pump shaft 820, while constraining radial deviation of the pump shaft 820 from the axis of rotation. In the example of FIGS. 9 and 10, the first and second bearings 940*a*, 940*b* may be plated-mounted bearings that stabilize the pump shaft 820 relative to the sleeve 930. For example, the first bearing 940*a* may include an inner race 942*a* that is fit onto the pump shaft 820, such as being press fit on to the pump shaft 820, and allowed to rotate with the pump shaft 820. The first bearing 940*a* may further include an outer race 946*a* that is fixed to a plate 948*a*. The first bearing 940*a* may further include a rotational component 944*a* (e.g., balls or spinners of an example ball bearing) that is arranged annually between the inner race 942*a* and the outer race 946*a* in order to permit the rotation of the inner race 942*a* relative to the outer race 946*a*. The second bearing 940*b* may be substantially analogous to the first bearing 940*a* and may include an inner race 942*b*, a rotational component 944*b*, an outer race 946*b*, and a plate 948*b*; redundant explanation of which is omitted here for clarity.

With reference to FIGS. 9 and 10, the trap 900 is further shown as including or otherwise being associated with a gas management system 970. The gas management system 970 may operate generally to purge the volume 992 of oxygen and to replace the oxygen with an inert gas. In the example of FIGS. 9 and 10, the gas management system 970 is shown as including tubing 972*a*, 972*b* with corresponding valves 974*a*, 974*b*. In one example, the tubing 972*a* and corresponding valve 974*a* may be coupled with the volume 992 via the first port 934*a*. The tubing 972*a* may be coupled with a vacuum system or the like that is configured to draw a vacuum flow 976 from the volume 992 in order to remove oxygen from the volume 992. Further, the tubing 972*b* and corresponding valve 974*b* may be coupled with the volume 992 via the second port 944*b*. The tubing 972*b* may be coupled with an inert gas source or the like that is configured to provide an inert gas flow 978 to the volume 992.

The trap 900 may be coupled such that porous container 910 is mounted about the pump shaft 820. For example, each sub container of the porous container 910 may be arranged to encircle a portion of the pump shaft 820 within the sealed volume 892. In relation to the third sub container 910*c*, the third sub-container 910*c* may be advanced along the pump shaft 820 such that the annular seat 927 is fit over a periphery of the mechanical seal 820. In some cases, the third sub-container 910*c* may be fixed to the sleeve 830 or otherwise fixed within the sealed volume 892 such that the sub-container is prevented from rotation with the pump shaft 820. As shown in FIG. 10, the third sub-container 910*c* may remain annularly spaced with the pump shaft 820 within the sealed volume 892. Next, the first bearing 940*a* may be advanced along the pump shaft 820 with the pump shaft 820 press fit into the inner race 942*a*. The plate 948*a* may be contoured to fit within the inner volume 932 defined by the sleeve 930 and configured to engage the inner surface 931*a* in a manner that mitigates axial movement of the first bearing 940*a*. Fasteners, including set screws and the like may also be used to constrain axial movement of the first bearing 940*a*. The plate 948*a* may also be used to support the third sub-container 910*c* within the sealed volume 892.

In relation to the second sub-container 910*b*, the second sub-container 910*b* may be advanced along the pump shaft 820 and fixed to the sleeve 830 or otherwise be fixed within the sealed volume 892 such that the sub-container is prevented from rotation with the pump shaft 820, including be fixed or supported by the plate 948*a* of the first bearing 940*a*. As shown in FIG. 10, the second sub-container 910*c* may remain annularly spaced with the pump shaft 820 within the sealed volume 892. Next, the second bearing 940*b* may be advanced along the pump shaft 820 with the pump shaft 820 press fit into the inner race 942*b*. The plate 948*b* may be contoured to fit within the inner volume 932 defined by the sleeve 930 and configured to engage the inner surface 931*a* in a manner that mitigates axial movement of the second bearing 940*b*. Fasteners, including set screws and the like may also be used to constrain axial movement of the second bearing 940*b*. The plate 948*b* may also be used to support the second sub-container 910*b* within the sealed volume 892.

In relation to the first sub-container 910*a*, the first sub-container 910*a* may be advanced along the pump shaft 820 and fixed to the sleeve 830 or otherwise be fixed within the sealed volume 892 such that the sub-container is prevented from rotation with the pump shaft 820, including be fixed or supported by the plate 948*b* of the second bearing 940*b*. As shown in FIG. 10, the second sub-container 910*c* may remain annularly spaced with the pump shaft 820 within the sealed volume 892.

Figure 11A:
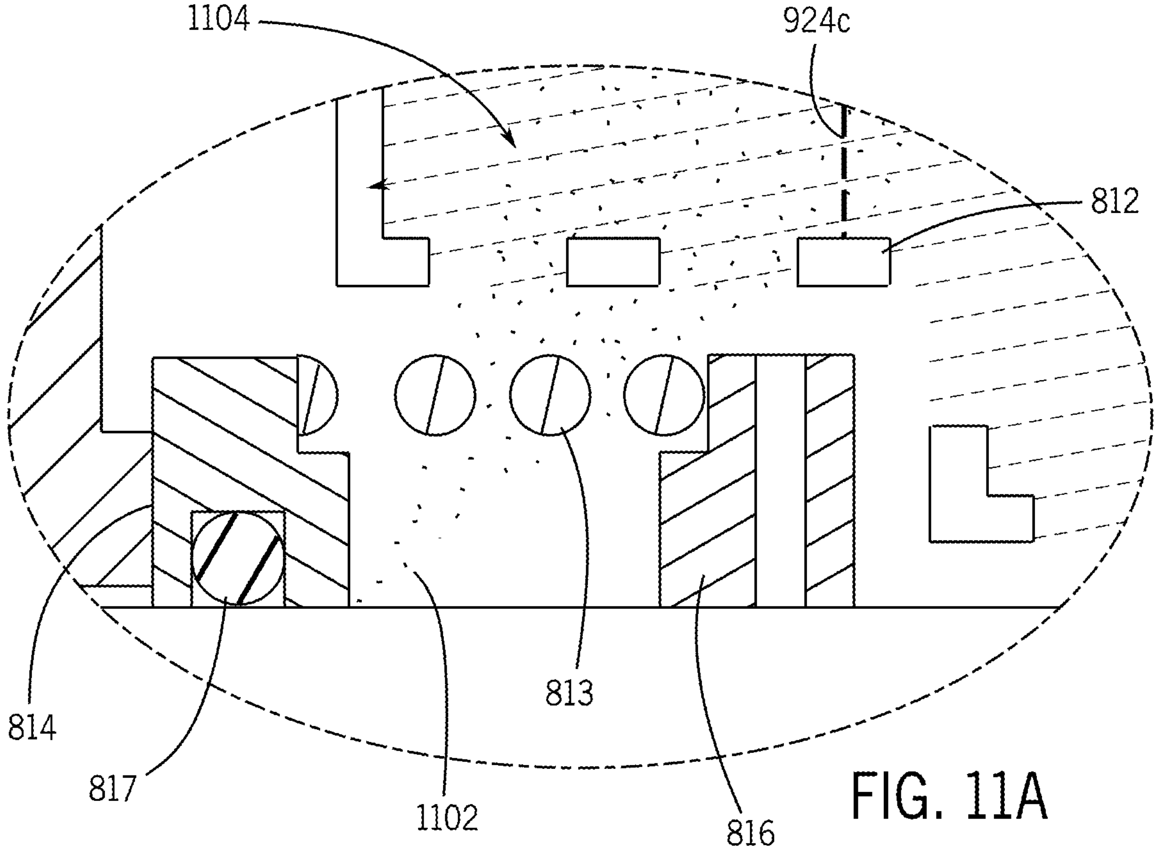
FIG. 11A depicts detail 11A-11A of FIG. 11.

In operation, and as shown in relation to FIGS. 11 and 11A, radioactive iodine 1102 (and/or other fission product, including, without limitation tritium, tellurium, cesium, or bromine) may be emitted from along the pump shaft 820. The porous container 910 including the absorbent material 905 may be position adjacent the pump shaft 820. In this regard, the radioactive iodine 1102 may travel from along the pump shaft 820 and toward the porous container 910 (e.g., the third sub container 910*c*). The radioactive iodine may enter the third sub-container 910*c* via the plurality of inner holes 914*c*. As shown in FIG. 11A, the radioactive iodine 1102 may define a gradient 1104 such that the radioactive iodine 1102 is dispersed within and collected by the absorbing material 905. By collecting the radioactive iodine in the absorbing material 905, the fission product trap 900 may operate to reduce the release of fission products into the broader containment vessel or region of the reactor system.

Figure 12:
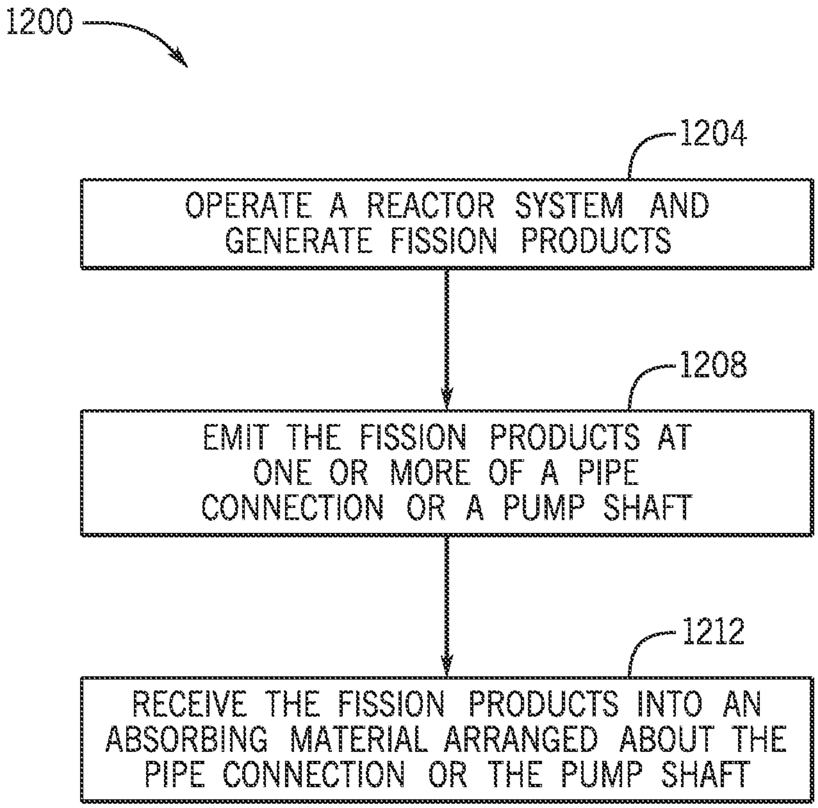
FIG. 12 depicts a flow diagram of an example method for capturing fission products from a reactor system.

FIG. 12 depicts a flow diagram of an example method for capturing fission products from a reactor system. At operation 1204, the reactor system is operated in order to generate fission products. For example, and with reference to FIG. 1, the system 100 may broadly be operable to generate fission products, including generating certain materials and byproducts that exhibit radioactive properties. As one example, the system 100 generates or causes a build up of certain radioactive iodine.

At operation 1208, fission products are emitted at one or both of a pipe connection or pump shaft of the reactor system. For example, and with reference to FIGS. 6 and 11, fission products may be emitted from the pipe connection 250 and/or from along the pump shaft 820. For example, radioactive iodine 602 may be emitted from the pipe connection 250. Further, radioactive iodine 1102 may be emitted from along the pump shaft 820.

At operation 1212, fission products are received into an absorbing material arranged about the pipe connection or the pump shaft of the reactor system. The absorbing material is arranged in a porous container mounted about the pipe connection or the pump shaft. For example, and with continued reference to FIGS. 6 and 11, the radioactive iodine 602 from the pipe connection 250 may be received by, and trapped within, the absorbing material 305 of the fission product trap 300. Further, the radioactive iodine 1102 from the along the pump shaft 820 may be received by, and trapped within, the absorbing material 905 of the fission product trap 900.

Other examples and implementations are within the scope and spirit of the disclosure and appended claims. For example, features implementing functions may also be physically located at various positions, including being distributed such that portions of functions are implemented at different physical locations. The foregoing description, for purposes of explanation, uses specific nomenclature to provide a thorough understanding of the described examples. However, it will be apparent to one skilled in the art that the specific details are not required in order to practice the described examples. Thus, the foregoing descriptions of the specific examples described herein are presented for purposes of illustration and description. They are not targeted to be exhaustive or to limit the examples to the precise forms disclosed. It will be apparent to one of ordinary skill in the art that many modifications and variations are possible in view of the above teachings.

What is claimed is:

1. A fission product trap configured for a pipe connection of a nuclear reactor system, the pipe connection defined by a pair of flanges, the trap comprising a porous container configured to be mounted about the pipe connection and having an absorbing material contained therein that is configured to collect fission products emitted from the pipe connection; and an assembly encompassing the porous container and configured to define a volume about the pipe connection;

wherein the porous container defines a recessed band configured to receive the pair of flanges therein.

2. The trap of claim 1, wherein the absorbing material comprises loose activated carbon, silver zeolite, or carbon nanostructures.

3. The trap of claim 1, wherein the fission products comprise radioactive iodine, tritium, tellurium, cesium, or bromine.

4. The trap of claim 1, wherein the porous container encompasses the pipe connection and wherein the volume defined by the assembly is a sealed volume.

5. The trap of claim 1, wherein the porous container comprises an inner shell that defines the recessed band, and an outer shell arranged about the inner shell and defining a holding space therebetween, and the absorbing material is arranged in the holding space.

6. The trap of claim 5, wherein the inner shell defines a plurality of holes positioned within the recessed band.

7. The trap of claim 1, wherein the assembly comprises a sleeve arranged over the porous container and the pipe connection, and a pair of clamping assemblies, each clamping assembly of the pair of clamping assemblies arranged along an end of the sleeve and configured to define a sealed connection with a respective pipe associated with the pipe connection.

8. The trap of claim 7, wherein each clamping assembly of the pair of clamping assemblies comprises a clamping shaft having a threaded outer surface and an axial passage therethrough, the axial passage configured to receive the respective pipe, a gripping element abutting the clamping shaft along an outer surface of the respective pipe, and a clamping nut having a complementary threaded inner surface configured to threadably engage the threaded outer surface of the clamping shaft.

9. The trap of claim 8, wherein, in response to a threaded engagement of the clamping shaft and the clamping nut toward one another, the gripping element is compressed therebetween and encouraged toward the outer surface of the respective pipe to establish a sealed boundary of the clamping assembly.

10. A nuclear reactor system comprising:

a first pipe, a second pipe, wherein the first pipe comprises a first flange and the second pipe comprises a second flange, and wherein the first flange and the second flange cooperate to define a pipe connection, and a fission product trap, the fission product trap comprising:

a porous container configured to be mounted about the pipe connection and having an absorbing material contained therein that is configured to collect fission products emitted from the pipe connection, and an assembly encompassing the porous container and configured to define a volume about the pipe connection, wherein the porous container defines a recessed band configured to receive the first flange and the second flange therein.

* * * * *